United States Patent
Mendola

(10) Patent No.: US 10,692,041 B1
(45) Date of Patent: Jun. 23, 2020

(54) INVENTORY HOLDER MARKERS FOR SELECTIVE GLOWING BASED ON RECEIVED WAVELENGTHS

(71) Applicant: Amazon Technologies, Inc., Seattle, WA (US)

(72) Inventor: Sergio Mendola, Georgetown, MA (US)

(73) Assignee: Amazon Technologies, Inc., Seattle, WA (US)

( * ) Notice: Subject to any disclaimer, the term of this patent is extended or adjusted under 35 U.S.C. 154(b) by 701 days.

(21) Appl. No.: 15/087,704

(22) Filed: Mar. 31, 2016

(51) Int. Cl.
*G06Q 10/08* (2012.01)
*G05B 15/02* (2006.01)
*B65G 1/04* (2006.01)

(52) U.S. Cl.
CPC ......... *G06Q 10/087* (2013.01); *B65G 1/0492* (2013.01); *G05B 15/02* (2013.01)

(58) Field of Classification Search
CPC ..... G06Q 10/087; B65G 1/0492; G05B 15/02
See application file for complete search history.

(56) References Cited

U.S. PATENT DOCUMENTS

| | | | | |
|---|---|---|---|---|
| 5,940,173 A * | 8/1999 | Tomii | .................... | G01N 21/95 356/445 |
| 7,826,919 B2 * | 11/2010 | D'Andrea | ............... | B66F 9/063 700/214 |
| 8,280,547 B2 | 10/2012 | D'Andrea et al. | | |
| 8,567,677 B1 * | 10/2013 | Yap | .......................... | G06K 7/12 235/454 |
| 9,087,314 B2 | 7/2015 | Hoffman et al. | | |
| 9,639,725 B1 * | 5/2017 | Maricic | ................... | H04N 5/232 |
| 9,792,580 B1 * | 10/2017 | Yan | ....................... | G06Q 10/087 |
| 9,792,581 B1 * | 10/2017 | Mendola | .............. | G06Q 10/087 |
| 10,059,006 B2 * | 8/2018 | Rublee | ................... | B25J 19/021 |
| 2002/0109603 A1 * | 8/2002 | Otto | ........................ | G06F 3/147 340/691.6 |
| 2002/0147597 A1 * | 10/2002 | Connors | .............. | G06Q 10/087 705/29 |

(Continued)

OTHER PUBLICATIONS

Javidi, Bahram. "Real-time remote identification and verification of objects using optical ID tags." Optical Engineering 42.8 (2003): 2346-2349.*

(Continued)

*Primary Examiner* — Asfand M Sheikh
(74) *Attorney, Agent, or Firm* — Kilpatrick Townsend & Stockton LLP

(57) ABSTRACT

Inventory systems may include storage locations or other elements that can be visually indicated by selective glowing triggered by received wavelengths. In one example, a selected storage location can be determined from among multiple storage locations. A set of one or more wavelengths may be determined that is operable, when received at multiple markers associated with the multiple locations, to cause one or more of the markers to emit a presentation that visibly indicates the selected storage location or provides a visible acknowledgement of an action associated with the selected storage location. Instructions can be provided to cause a wavelength source to emit the set of one or more wavelengths so as to reach the multiple markers and cause the presentation.

19 Claims, 11 Drawing Sheets

(56) References Cited

U.S. PATENT DOCUMENTS

| | | | | |
|---|---|---|---|---|
| 2005/0060171 | A1* | 3/2005 | Molnar | G06K 17/0022 |
| | | | | 340/572.1 |
| 2009/0134227 | A1* | 5/2009 | Roth | G06K 19/14 |
| | | | | 235/491 |
| 2011/0060449 | A1* | 3/2011 | Wurman | G05B 19/4189 |
| | | | | 700/218 |
| 2011/0192906 | A1* | 8/2011 | Wilds | G06K 19/14 |
| | | | | 235/468 |
| 2014/0175989 | A1* | 6/2014 | Arai | F21V 9/40 |
| | | | | 315/154 |
| 2015/0166210 | A1* | 6/2015 | Schram | G06Q 90/00 |
| | | | | 705/500 |
| 2015/0168727 | A1* | 6/2015 | Qaddoura | G02B 27/0172 |
| | | | | 345/156 |
| 2015/0169908 | A1* | 6/2015 | Hadley | G06K 7/0008 |
| | | | | 340/10.1 |
| 2015/0356657 | A1* | 12/2015 | Pas | G06Q 30/0629 |
| | | | | 705/26.64 |
| 2016/0098581 | A1* | 4/2016 | Mart Ascencio | G06Q 10/00 |
| | | | | 340/5.82 |
| 2018/0175630 | A1* | 6/2018 | Lilly | H02J 5/005 |

OTHER PUBLICATIONS

Prinetto, Paolo, and Marco Magliona. "Analysis and realization of smart labels for object interaction tracking." (2016-2017).*

Black Light. Datasheet [online]. Wikipedia, Mar. 9, 2016 [retrieved on Mar. 31, 2016]. Retrieved from the Internet: <URL: https://en.wikipedia.org/wiki/Black_light>, 4 pages.

Clear Neon Magic Invisible UV Reactive Spray Paint for Household and Clothing #1771. [online]. Clear Neon, Sep. 8, 2009 [retrieved on Mar. 31, 2016]. Retrieved from the Internet: <URL: http://www.amazon.com/Invisible-Reactive-Household-Clothing-Eraser/dp/B002OEPJFG>, 6 pages.

Table of Fluorochromes. Datasheet [online]. Salk Institute Center for Cytometry and Molecular Imaging, Oct. 20, 2014 [retrieved on Mar. 31, 2016]. Retrieved from the Internet: <URL: https://web.archive.org/web/20141020225338/http:/pingu.salk.edu:80/flow/fluo.html>, 6 pages.

Thermo Fisher Scientific. "Fluorescence Fundamentals" in *Molecular Probes® Handbook* [online]. Thermo Fisher Scientific, 2010 [retrieved on Mar. 31, 2016]. Retrieved from the Internet: <URL: http://www.thermofisher.com/us/en/home/references/molecular-probes-the-handbook/introduction-to-fluorescence-techniques.html#head3>, 9 pages.

Thermo Fisher Scientific. *Molecular Probes® Handbook* [online]. Thermo Fisher Scientific, 2010 [retrieved on Mar. 31, 2016]. Retrieved from the Internet: <URL: http://www.thermofisher.com/us/en/home/references/molecular-probes-the-handbook/>.

U.S. Appl. No. 15/188,746, U.S. Patent Application, filed Jun. 21, 2016, Titled: Dynamic Marker Using Disappearing Ink.

U.S. Appl. No. 15/188,771, U.S. Patent Application, filed Jun. 21, 2016, Titled: Dynamic Marker Responsive to Emitted Light.

* cited by examiner

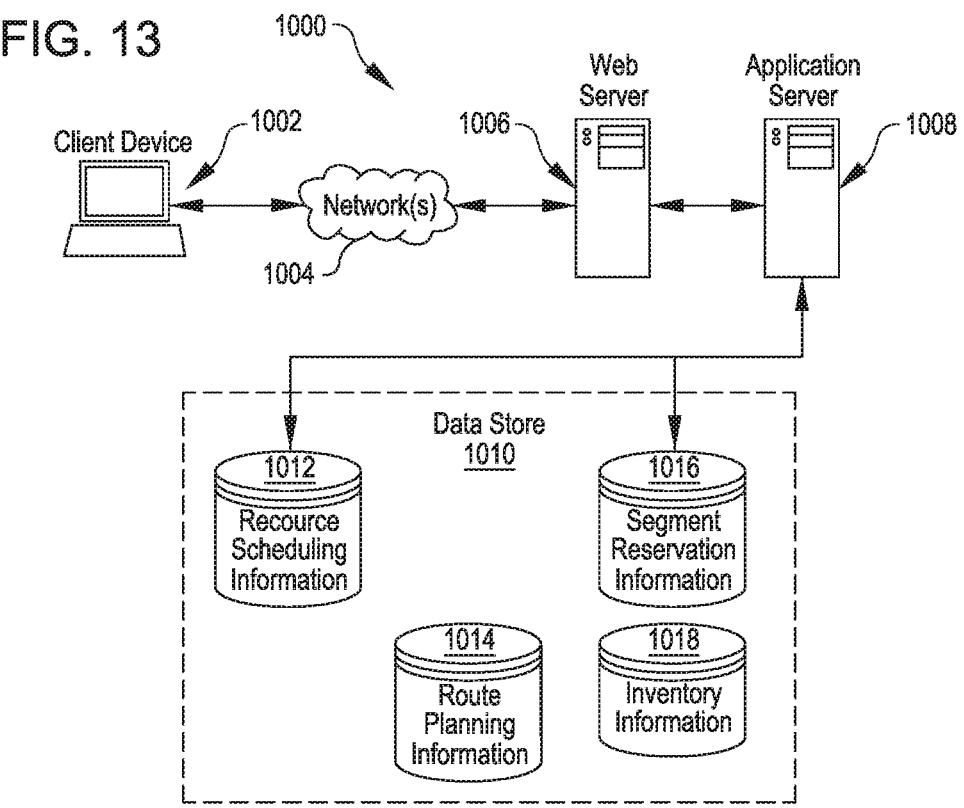

INVENTORY HOLDER MARKERS FOR SELECTIVE GLOWING BASED ON RECEIVED WAVELENGTHS

BACKGROUND

Modern inventory systems, such as those in mail order warehouses, supply chain distribution centers, airport luggage systems, and custom-order manufacturing facilities, face significant challenges in responding to requests for inventory items. To facilitate responding to such requests, many systems utilize automated components to assist operators in performing actions. In some systems, an operator may be tasked with performing different actions with respect to different storage locations on movable inventory holders presented to the operator (e.g., storing a first inventory item in one of many bins on one inventory holder and then storing a second inventory item in a particular bin on another inventory holder). Especially when considered collectively, delays in identifying appropriate storage locations for individual actions may result in significant losses in efficiency, throughput, or other metrics of the inventory system. Accordingly, techniques and associated system components for reducing storage identification delays are desirable.

BRIEF DESCRIPTION OF THE DRAWINGS

Various embodiments in accordance with the present disclosure will be described with reference to the drawings, in which:

FIG. 13 illustrates an environment in which various features of the inventory system can be implemented, in accordance with at least one embodiment.

DETAILED DESCRIPTION

Figure 1:
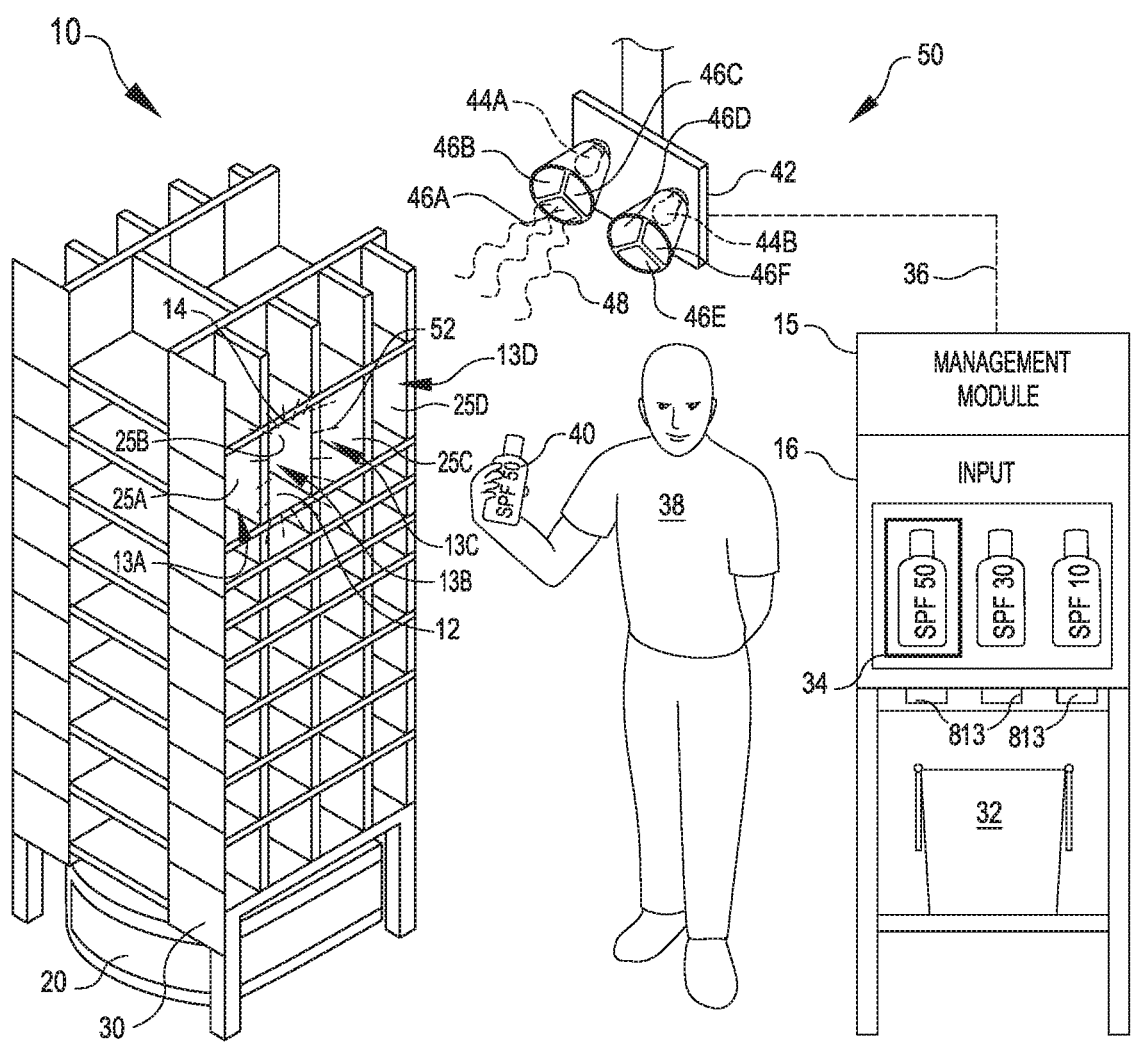
FIG. 1 illustrates a portion of an inventory system that can facilitate selective glowing for visual indication of bins within the inventory system according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, features herein are directed to features for indicating particular bins or other storage locations of an inventory holder or elsewhere in an inventory system. Systems herein may include appropriate components for causing a feature of a bin to glow or light up, e.g., functioning as a visual indication to call the attention of an operator to the glowing bin or to provide a visible acknowledgement of an action associated with a particular storage location. Features apart from the bin or bins of interest (e.g. features surrounding bins or other bins) can also be made to glow in a sequence and/or pattern to indicate, point to, or otherwise draw attention to the bin or bins of interest (e.g. with or without a bin of interest itself glowing).

In accordance with some embodiments, markers can be provided that allow bins to selectively glow. The markers may include paint, coating, or other material that receives ultraviolet light wavelengths (or other form of wavelength, such as infrared or other wavelength invisible to the human eye). In response to receiving these wavelengths, the markers glow or otherwise emit light that is visible to the human eye. Different material in different markers may respond differently to different ranges of received wavelengths, for example, allowing one marker to glow only in response to a first range of wavelengths and a second marker to glow only when exposed to wavelengths in a second, higher range.

In operation, a management module (e.g. included in or including a computer system) may identify a bin or bins of interests that are to be indicated within a larger group of bins through use of glowing capabilities. The management module may accordingly control a source of wavelengths (such as a projector with multiple black light bulbs or filters that can be alternatively utilized to project different ranges of wavelengths) and cause the source to project a specific wavelength or set of wavelengths that will cause a particular marker or group of markers to glow (e.g. individually or collectively in a suitable pattern or sequence). This glowing may visually indicate the specific bin or bins of interest. As an illustrative example, the bin or bins of interest may represent preferred storage location options in an inventory holder for an item that an operator is tasked with stowing, and the system can operate the source of wavelengths to cause these preferred bins to glow for ready identification by the operator.

Referring now to the drawings, FIG. 1 illustrates a portion of an inventory system 10 that can facilitate selective glowing for identification of bins 25 within the inventory system 10. In the arrangement shown in FIG. 1, the inventory system 10 includes a station 50, a mobile drive unit 20, an inventory holder 30, a management module 15, and a wavelength source 42. The station 50 can correspond to an area in which an operator 38 (e.g., a human) can perform actions with respect to the inventory holder 30, e.g., facilitated by functions performed by the management module 15. For example, the management module 15 may instruct the mobile drive unit 20 to move the inventory holder 30 to the station 50 so that the operator 38 can perform actions such as picking, counting, or storing inventory items 40 relative to one or more bins 25 of the inventory holder 30.

The management module 15 may utilize one or more suitable input devices 16. The input device 16 is shown in FIG. 1. as a touchscreen that allows an operator 38 to make a selection 34 indicating the specific inventory item 40 that is the subject of an operation by the operator 38. However, the input device 16 may additionally or alternatively include any other suitable components for obtaining information about inventory items 40 and/or storage locations accessible by the operator 38, including, but not limited to barcode scanners, cameras or other optical sensors, radiofrequency identification (RFID) equipment, or keypads. In FIG. 1, the storage locations are represented by bins 25 of the inventory holder 30 and a container 32, although other storage locations are possible. The container 32 may include incoming inventory items 40 for the inventory system 10 or other inventory items 40 to be transferred from the container 32 and stowed, for example, in a bin 25 of the inventory holder 30. Additionally or alternatively, the container 32 may function as a receptacle for collecting inventory items 40 picked from inventory holders 30 for fulfilling orders of the inventory system 10.

The inventory holder 30 depicted in FIG. 1 includes markers 13 (individually identified as markers 13A, 13B, 13C and 13D) each associated with a respective bin 25 (e.g., bin 25A, 25B, 25C and 25D). Each depicted marker 13 includes material that projects visible light (e.g., between 380 nm and 760 nm in wavelength) in response to receiving a wavelength within a particular range or spectrum. In various embodiments, the wavelength may fall within a particular range or frequency that is a subset of the ultraviolet spectrum (e.g., produced by a "black light" bulb), although other triggering wavelengths may be utilized including infrared or other wavelengths that are invisible to the unaided human eye (e.g., below 380 nm in wavelength or above 760 nm in wavelength). Generally, in various embodiments, the markers 13 are capable of receiving one wavelength (e.g., an invisible wavelength) as an input and emitting another wavelength (e.g., a visible wavelength) as an output. The markers 13 in many embodiments may perform such a wavelength transformation in a passive process that results from the properties of the markers 13, e.g., without electronic components such as sensors, circuitry, or bulbs incorporated in the markers 13. As an illustrative example, the marker 13B for a particular bin 25B may include paint (e.g., commercially available or proprietary) or other coating that is applied to the base 12 and walls 14 of that bin 25B and that glows (e.g., emits light 52 visible to the operator 38) in response to exposure to a particular frequency range emitted from a "black light" bulb. In some embodiments, suitable materials for markers 13 can include fluorophores (alternatively called fluorochromes) that absorb light energy of a specific wavelength that cause a shift from a ground state to an excited state in which light is re-emitted at another (e.g., longer) wavelength. Non-limiting examples of materials that may receive wavelengths in the ultraviolet spectrum (e.g., equal to or less than about 380 nm) and respond by emitting wavelengths in the visible spectrum (e.g., equal to or greater than about 380 nm) include Hydroxycoumarin, Aminocoumarin, Methoxycoumarin, Alexa Fluor 350, DyLight 350, Hoechst 33342, DAPI, Hoechst 33258, Indo-1, Y66H, Y66F, and Monochlorobimane.

The markers 13 depicted in FIG. 1 can be calibrated to emit visible light 52 in response to different triggering wavelengths, e.g., so that each marker 13 has a triggering wavelength that is different from at least one other triggering wavelength for one of the other markers 13. This variety may permit a particular wavelength or set of wavelengths to be projected toward the inventory holder 30 to cause glowing of a specific set of markers 13 that correspond to the wavelength or set of wavelengths projected toward all of the markers 13. For example, a particular wavelength or set of wavelengths may be projected toward the inventory holder 30 by the wavelength source 42.

The wavelength source 42 can include any suitable components for projecting or emitting different wavelengths for triggering visible light 52 from the markers 13. The wavelength source 42 in FIG. 1 is shown with two bulbs 44A and 44B each situated adjacent to rotating wheels that can change which filter 46 (individually shown as filter 46A-46F) acts on projections from the bulbs 44, but any combination of bulbs, filters, lenses, or other features may be used for providing different wavelengths 48 for triggering emission of visible light 52 from the markers 13. In an illustrative example, bulbs including different phosphors may be utilized to emit different varieties of "black light" or ultraviolet wavelengths. In some embodiments, multiple wavelength sources 42 may be utilized, for example, to each provide a different set of one or more suitable wavelengths 48.

Turning now to a first illustrative example (relating to a stowing process) that may be understood with respect to FIG. 1, the operator 38 may remove a specific inventory item 40 (e.g., a bottle of SPF 50 sunscreen) from the container 32 and, in order to indicate which particular item 40 will be stowed next, make a selection 34 on the screen of the input device 16 (or scan or otherwise identify the inventory item 40 for the management module 15). The management module 15 may respond to this information and determine that the second bin 25B is an ideal storage location for the selected inventory item 40 of the bottle of SPF 50 sunscreen. The management module 15 may access information about the second bin 25B, such as a particular wavelength that is operable to trigger a marker 13B of the second bin 25B. The management module 15 may communicate (as at 36) with and cause the wavelength source 42 to position a first filter 46A relative to a first bulb 44A therein to produce that particular wavelength 48. The wavelength source 42 may project the particular wavelength 48 so that it is received along each of the markers 13A-13D. The marker 13B for the second bin 25B may glow in response and emit light 52 visible to the operator 38 while none of the other markers 13A, 13C, or 13D exhibit any visible reaction to that particular wavelength 48. In this way, the operator 38 may see the second bin 25B glowing and recognize it as the appropriate location for stowing the particular inventory item 40 (e.g., the bottle of SPF 50 sunscreen).

In a second illustrative example (relating to a picking process), the selection 34 on the touchscreen of the input device 16 may indicate that the bottle of SPF 50 sunscreen is the next inventory item 40 that the operator 38 is to remove from the inventory holder 30 and place in the container 32. The management module 15 may communicate (as at 36) with the wavelength source 42 to cause the particular wavelength 48 to be projected so that the marker 13B of the particular bin 25B containing the particular inventory item 40 glows. This glowing may provide a suitable visual cue to indicate to the operator 38 which bin 25B contains the inventory item 40 (e.g., the SPF 50 sunscreen) to be transferred to the container 32. In some cases, the operator 38 may additionally confirm the selection 34 (or scan or otherwise identify the retrieved inventory item 40), for example, as an extra precaution against placement of the retrieved item 40 in an incorrect storage location, such as if multiple containers 32 are available to the operator 38. Moreover, in some cases, glowing functionality may additionally or alternatively be used for indicating a storage location such as the container 32 among multiple such options.

In various embodiments, glowing functionality may be accomplished without a direct line of sight from the wavelength source 42 to the respective bins 25 of the inventory holder 30. For example, the wavelengths 48 may reflect and refract around obstacles such as an arm of an operator 38 that may otherwise at least occasionally block a direct line of sight between the wavelength source 42 and the bins 25. Additionally, in various embodiments, glowing functionality may be achieved without obtaining or utilizing specific information about the location and/or orientation of the inventory holder 30 and/or bins 25 or other associated elements. The wavelengths 48 may reach the bins 25 and prompt glowing, regardless of whether the inventory holder is presented askew or otherwise out of alignment with an expected orientation of the inventory holder 30 at the station 50. This capacity of the markers 13 to illuminate without precise aiming of the wavelengths 48 may allow glowing functionality to be provided without calculation-intensive processes. This may be in contrast to other technologies that require precise aiming of a light source (such as for a laser beam or from an image projector) toward a particular location to individually identify a storage location that is a target of a respective action by an operator. Such other technologies may rely on calculation-intensive processes of identifying an exact placement of a target location and aiming the light source so as to solely illuminate that calculated location, but use of the selectively responsive glowing markers 13 as described herein may allow a target location to be visually identified without the system necessarily first identifying an exact placement of that target location. In effect, an entire inventory holder 30 or other area that includes glowing markers 13 can be flooded by or otherwise generally exposed to particular wavelengths, and only the specific markers 13 that are responsive to the particular wavelengths will be visibly illuminated to the operator.

Figure 2:
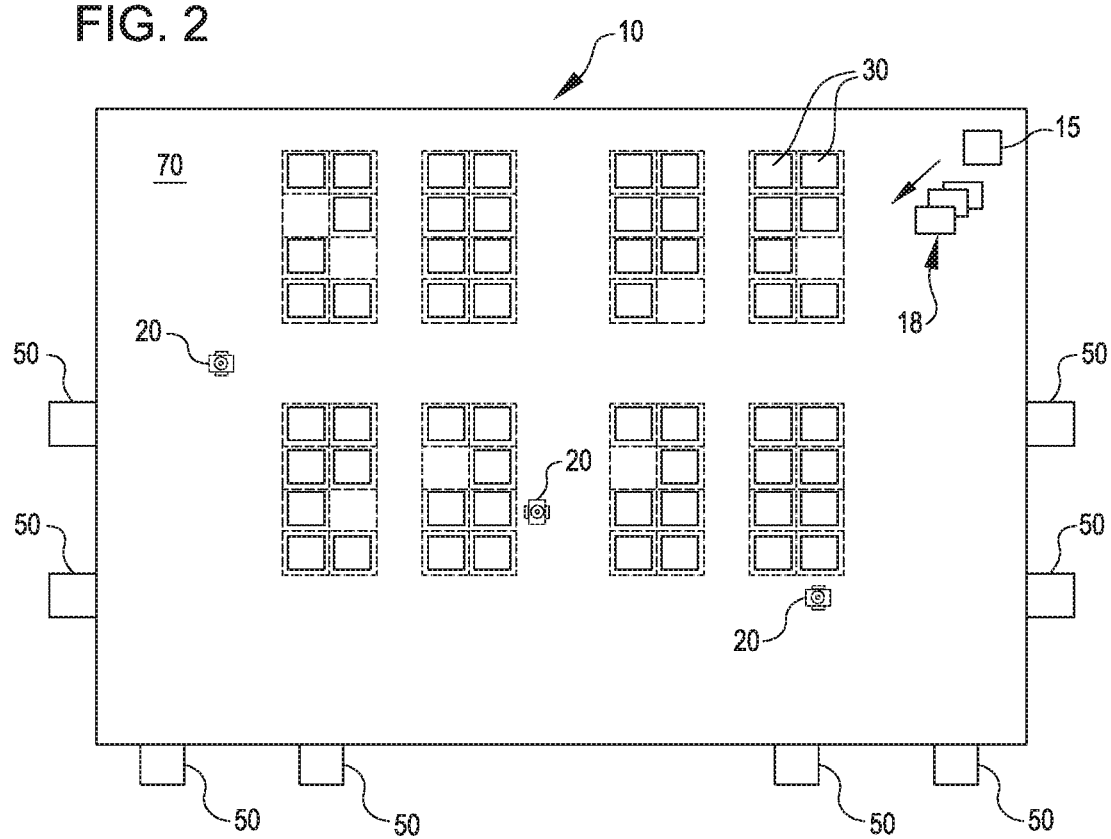
FIG. 2 illustrates components of the inventory system of FIG. 1 according to certain embodiments.

FIG. 2 illustrates components of the inventory system 10 at another scale. The inventory system 10 includes a management module 15, one or more mobile drive units 20, one or more inventory holders 30, and one or more inventory stations 50. Mobile drive units 20 transport inventory holders 30 between points within a workspace 70 in response to commands communicated by management module 15. Each inventory holder 30 stores one or more types of inventory items. As a result, the inventory system 10 is capable of moving inventory items between locations within workspace 70 to facilitate the entry, processing, and/or removal of inventory items from inventory system 10 and the completion of other tasks involving inventory items.

Management module 15 assigns tasks to appropriate components of inventory system 10 and coordinates operation of the various components in completing the tasks. These tasks may relate not only to the movement and processing of inventory items, but also to the management and maintenance of the components of inventory system 10. For example, management module 15 may assign portions of workspace 70 as parking spaces for mobile drive units 20, the scheduled recharge or replacement of mobile drive unit batteries, the storage of empty inventory holders 30, or any other operations associated with the functionality supported by inventory system 10 and its various components. Management module 15 may select components of inventory system 10 to perform these tasks and communicate appropriate commands and/or data to the selected components to facilitate completion of these operations. Although shown in FIG. 2 as a single, discrete component, management module 15 may represent multiple components and may represent or include portions of mobile drive units 20 or other elements of inventory system 10. As a result, any or all of the interactions between a particular mobile drive unit 20 and management module 15 that are described below may, in particular embodiments, represent peer-to-peer communication between that mobile drive unit 20 and one or more other mobile drive units 20. The components and operation of an example embodiment of management module 15 are discussed further below with respect to FIG. 3.

Mobile drive units 20 move inventory holders 30 between locations within workspace 70. Mobile drive units 20 may represent any devices or components appropriate for use in inventory system 10 based on the characteristics and configuration of inventory holders 30 and/or other elements of inventory system 10. In a particular embodiment of inventory system 10, mobile drive units 20 represent independent, self-powered devices configured to freely move about workspace 70. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 20 represent elements of a tracked inventory system configured to move inventory holder 30 along tracks, rails, cables, crane system, or other guidance or support elements traversing workspace 70. In such an embodiment, mobile drive units 20 may receive power and/or support through a connection to the guidance elements, such as a powered rail. Additionally, in particular embodiments of inventory system 10 mobile drive units 20 may be configured to utilize alternative conveyance equipment to move within workspace 70 and/or between separate portions of workspace 70. The components and operation of an example embodiment of a mobile drive unit 20 are discussed further below with respect to FIGS. 4 and 5.

Additionally, mobile drive units 20 may be capable of communicating with management module 15 to receive information identifying selected inventory holders 30, transmit the locations of mobile drive units 20, or exchange any other suitable information to be used by management module 15 or mobile drive units 20 during operation. Mobile drive units 20 may communicate with management module 15 wirelessly, using wired connections between mobile drive units 20 and management module 15, and/or in any other appropriate manner. As one example, particular embodiments of mobile drive unit 20 may communicate with management module 15 and/or with one another using 802.11, Bluetooth, or Infrared Data Association (IrDA) standards, or any other appropriate wireless communication protocol. As another example, in a tracked inventory system 10, tracks or other guidance elements upon which mobile drive units 20 move may be wired to facilitate communication between mobile drive units 20 and other components of inventory system 10. Furthermore, as noted above, management module 15 may include components of individual mobile drive units 20. Thus, for the purposes of this description and the claims that follow, communication between management module 15 and a particular mobile drive unit 20 may represent communication between components of a particular mobile drive unit 20. In general, mobile drive units 20 may be powered, propelled, and controlled in any manner appropriate based on the configuration and characteristics of inventory system 10.

Inventory holders 30 store inventory items. In a particular embodiment, inventory holders 30 include multiple storage bins with each storage bin capable of holding one or more types of inventory items. Inventory holders 30 are capable of being carried, rolled, and/or otherwise moved by mobile drive units 20. In particular embodiments, inventory holder 30 may provide additional propulsion to supplement that provided by mobile drive unit 20 when moving inventory holder 30.

Additionally, in particular embodiments, inventory items 40 may also hang from hooks or bars (not shown) within or on inventory holder 30. In general, inventory holder 30 may store inventory items 40 in any appropriate manner within inventory holder 30 and/or on the external surface of inventory holder 30.

Additionally, each inventory holder 30 may include a plurality of faces, and each bin may be accessible through one or more faces of the inventory holder 30. For example, in a particular embodiment, inventory holder 30 includes four faces. In such an embodiment, bins located at a corner of two faces may be accessible through either of those two faces, while each of the other bins is accessible through an opening in one of the four faces. Mobile drive unit 20 may be configured to rotate inventory holder 30 at appropriate times to present a particular face and the bins associated with that face to an operator or other components of inventory system 10.

Inventory items represent any objects suitable for storage, retrieval, and/or processing in an automated inventory system 10. For the purposes of this description, "inventory items" may represent any one or more objects of a particular type that are stored in inventory system 10. Thus, a particular inventory holder 30 is currently "storing" a particular inventory item if the inventory holder 30 currently holds one or more units of that type. As one example, inventory system 10 may represent a mail order warehouse facility, and inventory items may represent merchandise stored in the warehouse facility. During operation, mobile drive units 20 may retrieve inventory holders 30 containing one or more inventory items requested in an order to be packed for delivery to a customer or inventory holders 30 carrying pallets containing aggregated collections of inventory items for shipment. Moreover, in particular embodiments of inventory system 10, boxes containing completed orders may themselves represent inventory items.

In particular embodiments, inventory system 10 may also include one or more inventory stations 50. Inventory stations 50 represent locations designated for the completion of particular tasks involving inventory items. Such tasks may include the removal of inventory items from inventory holders 30, the introduction of inventory items into inventory holders 30, the counting of inventory items in inventory holders 30, the decomposition of inventory items (e.g. from pallet- or case-sized groups to individual inventory items), the consolidation of inventory items between inventory holders 30, and/or the processing or handling of inventory items in any other suitable manner. In particular embodiments, inventory stations 50 may just represent the physical locations where a particular task involving inventory items can be completed within workspace 70. In alternative embodiments, inventory stations 50 may represent both the physical location and also any appropriate equipment for processing or handling inventory items, such as scanners for monitoring the flow of inventory items in and out of inventory system 10, communication interfaces for communicating with management module 15, and/or any other suitable components. Inventory stations 50 may be controlled, entirely or in part, by operators or may be fully automated. Moreover, the operator or automated operators of inventory stations 50 may be capable of performing certain tasks to inventory items, such as packing, counting, or transferring inventory items, as part of the operation of inventory system 10.

Workspace 70 represents an area associated with inventory system 10 in which mobile drive units 20 can move and/or inventory holders 30 can be stored. For example, workspace 70 may represent all or part of the floor of a mail-order warehouse in which inventory system 10 operates. Although FIG. 2 shows, for the purposes of illustration, an embodiment of inventory system 10 in which workspace 70 includes a fixed, predetermined, and finite physical space, particular embodiments of inventory system 10 may include mobile drive units 20 and inventory holders 30 that are configured to operate within a workspace 70 that is of variable dimensions and/or an arbitrary geometry. While FIG. 2 illustrates a particular embodiment of inventory system 10 in which workspace 70 is entirely enclosed in a building, alternative embodiments may utilize workspaces 70 in which some or all of the workspace 70 is located outdoors, within a vehicle (such as a cargo ship), or otherwise unconstrained by any fixed structure.

In operation, management module 15 selects appropriate components to complete particular tasks and transmits task assignments 18 to the selected components to trigger completion of the relevant tasks. Each task assignment 18 defines one or more tasks to be completed by a particular component. These tasks may relate to the retrieval, storage, replenishment, and counting of inventory items and/or the management of mobile drive units 20, inventory holders 30, inventory stations 50 and other components of inventory system 10. Depending on the component and the task to be completed, a particular task assignment 18 may identify locations, components, and/or actions associated with the corresponding task and/or any other appropriate information to be used by the relevant component in completing the assigned task.

In particular embodiments, management module 15 generates task assignments 18 based, in part, on inventory requests that management module 15 receives from other components of inventory system 10 and/or from external components in communication with management module 15. These inventory requests identify particular operations to be completed involving inventory items stored or to be stored within inventory system 10 and may represent communication of any suitable form. For example, in particular embodiments, an inventory request may represent a shipping order specifying particular inventory items that have been purchased by a customer and that are to be retrieved from inventory system 10 for shipment to the customer. Management module 15 may also generate task assignments 18 independently of such inventory requests, as part of the overall management and maintenance of inventory system 10. For example, management module 15 may generate task assignments 18 in response to the occurrence of a particular event (e.g., in response to a mobile drive unit 20 requesting a space to park), according to a predetermined schedule (e.g., as part of a daily start-up routine), or at any appropriate time based on the configuration and characteristics of inventory system 10. After generating one or more task assignments 18, management module 15 transmits the generated task assignments 18 to appropriate components for completion of the corresponding task. The relevant components then execute their assigned tasks.

With respect to mobile drive units 20 specifically, management module 15 may, in particular embodiments, communicate task assignments 18 to selected mobile drive units 20 that identify one or more destinations for the selected mobile drive units 20. Management module 15 may select a mobile drive unit 20 to assign the relevant task based on the location or state of the selected mobile drive unit 20, an indication that the selected mobile drive unit 20 has completed a previously-assigned task, a predetermined schedule, and/or any other suitable consideration. These destinations may be associated with an inventory request the management module 15 is executing or a management objective the management module 15 is attempting to fulfill. For example, the task assignment may define the location of an inventory holder 30 to be retrieved, an inventory station 50 to be visited, a storage location where the mobile drive unit 20 should park until receiving another task, or a location associated with any other task appropriate based on the configuration, characteristics, and/or state of inventory system 10, as a whole, or individual components of inventory system 10. For example, in particular embodiments, such decisions may be based on the popularity of particular inventory items, the staffing of a particular inventory station 50, the tasks currently assigned to a particular mobile drive unit 20, and/or any other appropriate considerations.

As part of completing these tasks mobile drive units 20 may dock with and transport inventory holders 30 within workspace 70. Mobile drive units 20 may dock with inventory holders 30 by connecting to, lifting, and/or otherwise interacting with inventory holders 30 in any other suitable manner so that, when docked, mobile drive units 20 are coupled to and/or support inventory holders 30 and can move inventory holders 30 within workspace 70. While the description below focuses on particular embodiments of mobile drive unit 20 and inventory holder 30 that are configured to dock in a particular manner, alternative embodiments of mobile drive unit 20 and inventory holder 30 may be configured to dock in any manner suitable to allow mobile drive unit 20 to move inventory holder 30 within workspace 70. Additionally, as noted below, in particular embodiments, mobile drive units 20 represent all or portions of inventory holders 30. In such embodiments, mobile drive units 20 may not dock with inventory holders 30 before transporting inventory holders 30 and/or mobile drive units 20 may each remain continually docked with a particular inventory holder 30.

While the appropriate components of inventory system 10 complete assigned tasks, management module 15 may interact with the relevant components to ensure the efficient use of space, equipment, manpower, and other resources available to inventory system 10. As one specific example of such interaction, management module 15 is responsible, in particular embodiments, for planning the paths mobile drive units 20 take when moving within workspace 70 and for allocating use of a particular portion of workspace 70 to a particular mobile drive unit 20 for purposes of completing an assigned task. In such embodiments, mobile drive units 20 may, in response to being assigned a task, request a path to a particular destination associated with the task. Moreover, while the description below focuses on one or more embodiments in which mobile drive unit 20 requests paths from management module 15, mobile drive unit 20 may, in alternative embodiments, generate its own paths.

Components of inventory system 10 may provide information to management module 15 regarding their current state, other components of inventory system 10 with which they are interacting, and/or other conditions relevant to the operation of inventory system 10. This may allow management module 15 to utilize feedback from the relevant components to update algorithm parameters, adjust policies, or otherwise modify its decision-making to respond to changes in operating conditions or the occurrence of particular events.

In addition, while management module 15 may be configured to manage various aspects of the operation of the components of inventory system 10, in particular embodiments, the components themselves may also be responsible for decision-making relating to certain aspects of their operation, thereby reducing the processing load on management module 15.

Thus, based on its knowledge of the location, current state, and/or other characteristics of the various components of inventory system 10 and an awareness of all the tasks currently being completed, management module 15 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 10 may be able to support a number of techniques for efficiently executing various aspects of the operation of inventory system 10. As a result, particular embodiments of management module 15 may, by implementing one or more management techniques described below, enhance the efficiency of inventory system 10 and/or provide other operational benefits.

Figure 3:
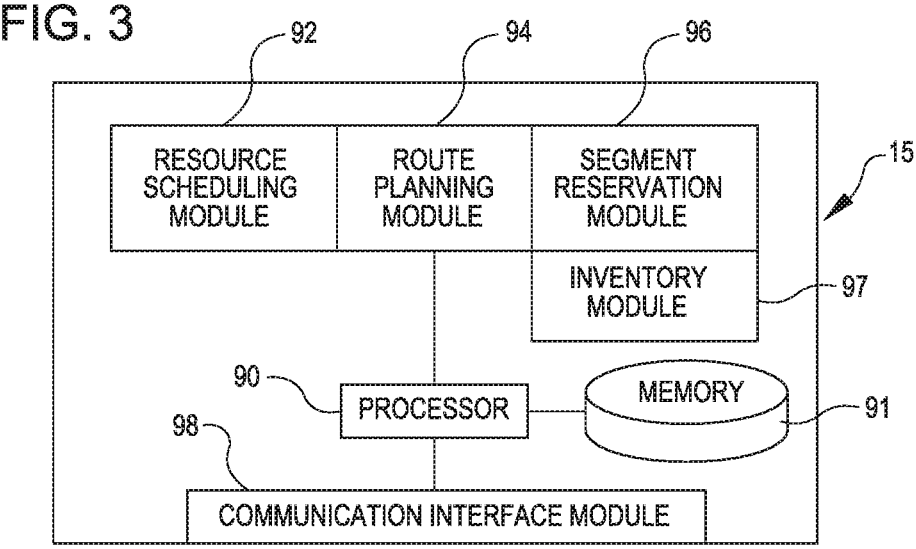
FIG. 3 illustrates in greater detail the components of an example of a management module that may be utilized in particular embodiments of the inventory system shown in FIG. 2.

FIG. 3 illustrates in greater detail the components of a particular embodiment of management module 15. As shown, the example embodiment includes a resource scheduling module 92, a route planning module 94, a segment reservation module 96, an inventory module 97, a communication interface module 98, a processor 90, and a memory 91. Management module 15 may represent a single component, multiple components located at a central location within inventory system 10, or multiple components distributed throughout inventory system 10. For example, management module 15 may represent components of one or more mobile drive units 20 that are capable of communicating information between the mobile drive units 20 and coordinating the movement of mobile drive units 20 within workspace 70. In general, management module 15 may include any appropriate combination of hardware and/or software suitable to provide the described functionality.

Processor 90 is operable to execute instructions associated with the functionality provided by management module 15. Processor 90 may comprise one or more general purpose computers, dedicated microprocessors, or other processing devices capable of communicating electronic information. Examples of processor 90 include one or more application-specific integrated circuits (ASICs), field programmable gate arrays (FPGAs), digital signal processors (DSPs) and any other suitable specific or general purpose processors.

Memory 91 stores processor instructions, inventory requests, reservation information, state information for the various components of inventory system 10 and/or any other appropriate values, parameters, or information utilized by management module 15 during operation. Memory 91 may represent any collection and arrangement of volatile or nonvolatile, local or remote devices suitable for storing data.

Examples of memory 91 include, but are not limited to, random access memory (RAM) devices, read only memory (ROM) devices, magnetic storage devices, optical storage devices or any other suitable data storage devices.

Resource scheduling module 92 processes received inventory requests and generates one or more assigned tasks to be completed by the components of inventory system 10. Resource scheduling module 92 may also select one or more appropriate components for completing the assigned tasks and, using communication interface module 98, communicate the assigned tasks to the relevant components. Additionally, resource scheduling module 92 may also be responsible for generating assigned tasks associated with various management operations, such as prompting mobile drive units 20 to recharge batteries or have batteries replaced, instructing inactive mobile drive units 20 to park in a location outside the anticipated traffic flow or a location near the anticipated site of future tasks, and/or directing mobile drive units 20 selected for repair or maintenance to move towards a designated maintenance station.

Route planning module 94 receives route requests from mobile drive units 20. These route requests identify one or more destinations associated with a task the requesting mobile drive unit 20 is executing. In response to receiving a route request, route planning module 94 generates a path to one or more destinations identified in the route request. Route planning module 94 may implement any appropriate algorithms utilizing any appropriate parameters, factors, and/or considerations to determine the appropriate path. After generating an appropriate path, route planning module 94 transmits a route response identifying the generated path to the requesting mobile drive unit 20 using communication interface module 98.

Segment reservation module 96 receives reservation requests from mobile drive units 20 attempting to move along paths generated by route planning module 94. These reservation requests request the use of a particular portion of workspace 70 (referred to herein as a "segment") to allow the requesting mobile drive unit 20 to avoid collisions with other mobile drive units 20 while moving across the reserved segment. In response to received reservation requests, segment reservation module 96 transmits a reservation response granting or denying the reservation request to the requesting mobile drive unit 20 using the communication interface module 98.

The inventory module 97 maintains information about the location and number of inventory items 40 in the inventory system 10. Information can be maintained about the number of inventory items 40 in a particular inventory holder 30, and the maintained information can include the location of those inventory items 40 in the inventory holder 30. The inventory module 97 can also communicate with the mobile drive units 20, utilizing task assignments 18 to maintain, replenish or move inventory items 40 within the inventory system 10.

Communication interface module 98 facilitates communication between management module 15 and other components of inventory system 10, including reservation responses, reservation requests, route requests, route responses, and task assignments. These reservation responses, reservation requests, route requests, route responses, and task assignments may represent communication of any form appropriate based on the capabilities of management module 15 and may include any suitable information. Depending on the configuration of management module 15, communication interface module 98 may be responsible for facilitating either or both of wired and wireless communication between management module 15 and the various components of inventory system 10. In particular embodiments, management module 15 may communicate using communication protocols such as 802.11, Bluetooth, or Infrared Data Association (IrDA) standards. Furthermore, management module 15 may, in particular embodiments, represent a portion of mobile drive unit 20 or other components of inventory system 10. In such embodiments, communication interface module 98 may facilitate communication between management module 15 and other parts of the same system component.

In general, resource scheduling module 92, route planning module 94, segment reservation module 96, inventory module 97, and communication interface module 98 may each represent any appropriate hardware and/or software suitable to provide the described functionality. In addition, as noted above, management module 15 may, in particular embodiments, represent multiple different discrete components and any or all of resource scheduling module 92, route planning module 94, segment reservation module 96, inventory module 97, and communication interface module 98 may represent components physically separate from the remaining elements of management module 15. Moreover, any two or more of resource scheduling module 92, route planning module 94, segment reservation module 96, inventory module 97, and communication interface module 98 may share common components. For example, in particular embodiments, resource scheduling module 92, route planning module 94, segment reservation module 96, and inventory module 97 represent computer processes executing on processor 90 and communication interface module 98 comprises a wireless transmitter, a wireless receiver, and a related computer process executing on processor 90.

Figure 4:
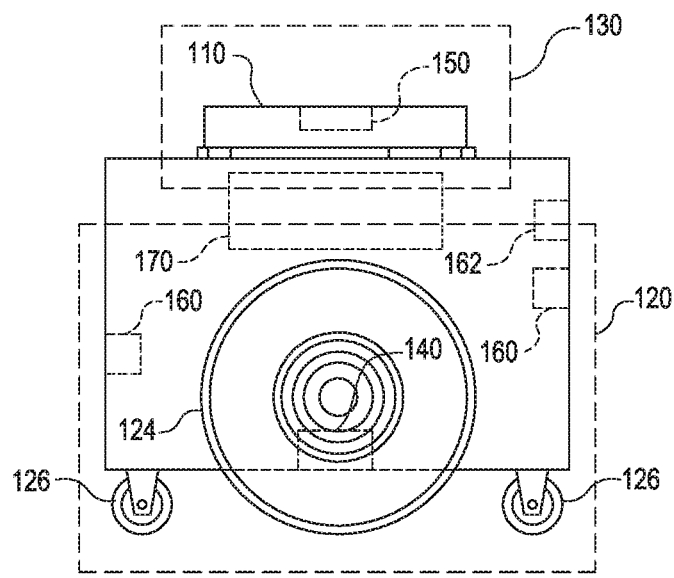
FIGS. 4 and 5 illustrate in greater detail an example of a mobile drive unit that may be utilized in particular embodiments of the inventory system shown in FIG. 2.
Figure 5:
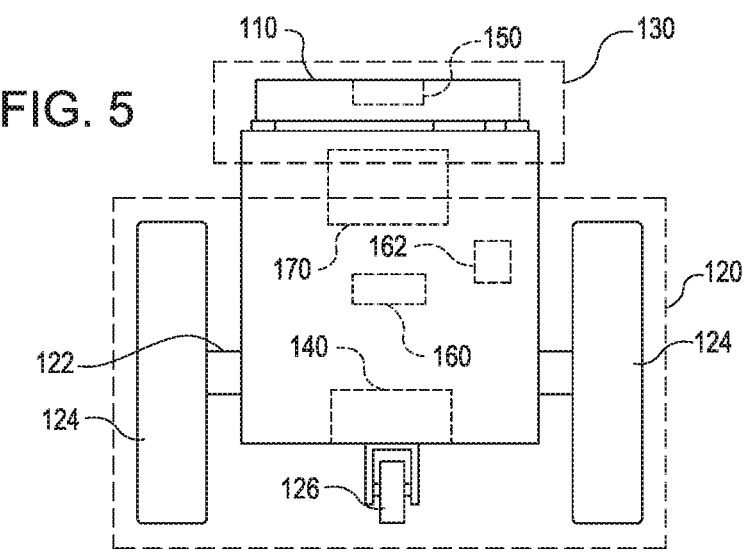

FIGS. 4 and 5 illustrate in greater detail the components of a particular embodiment of mobile drive unit 20. In particular, FIGS. 4 and 5 include a front and side view of an example mobile drive unit 20. Mobile drive unit 20 includes a docking head 110, a drive module 120, a docking actuator 130, and a control module 170. Additionally, mobile drive unit 20 may include one or more sensors configured to detect or determine the location of mobile drive unit 20, inventory holder 30, and/or other appropriate elements of inventory system 10. In the illustrated embodiment, mobile drive unit 20 includes a position sensor 140, a holder sensor 150, an obstacle sensor 160, and an identification signal transmitter 162.

Docking head 110, in particular embodiments of mobile drive unit 20, couples mobile drive unit 20 to inventory holder 30 and/or supports inventory holder 30 when mobile drive unit 20 is docked to inventory holder 30. Docking head 110 may additionally allow mobile drive unit 20 to maneuver inventory holder 30, such as by lifting inventory holder 30, propelling inventory holder 30, rotating inventory holder 30, and/or moving inventory holder 30 in any other appropriate manner. Docking head 110 may also include any appropriate combination of components, such as ribs, spikes, and/or corrugations, to facilitate such manipulation of inventory holder 30. For example, in particular embodiments, docking head 110 may include a high-friction portion that abuts a portion of inventory holder 30 while mobile drive unit 20 is docked to inventory holder 30. In such embodiments, frictional forces created between the high-friction portion of docking head 110 and a surface of inventory holder 30 may induce translational and rotational movement in inventory holder 30 when docking head 110 moves and rotates, respectively. As a result, mobile drive unit 20 may be able to manipulate inventory holder 30 by moving or rotating docking head 110, either independently or as a part of the movement of mobile drive unit 20 as a whole.

Drive module 120 propels mobile drive unit 20 and, when mobile drive unit 20 and inventory holder 30 are docked, inventory holder 30. Drive module 120 may represent any appropriate collection of components operable to propel mobile drive unit 20. For example, in the illustrated embodiment, drive module 120 includes motorized axle 122, a pair of motorized wheels 124, and a pair of stabilizing wheels 126. One motorized wheel 124 is located at each end of motorized axle 122, and one stabilizing wheel 126 is positioned at each end of mobile drive unit 20.

Docking actuator 130 moves docking head 110 towards inventory holder 30 to facilitate docking of mobile drive unit 20 and inventory holder 30. Docking actuator 130 may also be capable of adjusting the position or orientation of docking head 110 in other suitable manners to facilitate docking. Docking actuator 130 may include any appropriate components, based on the configuration of mobile drive unit 20 and inventory holder 30, for moving docking head 110 or otherwise adjusting the position or orientation of docking head 110. For example, in the illustrated embodiment, docking actuator 130 includes a motorized shaft (not shown) attached to the center of docking head 110. The motorized shaft is operable to lift docking head 110 as appropriate for docking with inventory holder 30.

Drive module 120 may be configured to propel mobile drive unit 20 in any appropriate manner. For example, in the illustrated embodiment, motorized wheels 124 are operable to rotate in a first direction to propel mobile drive unit 20 in a forward direction. Motorized wheels 124 are also operable to rotate in a second direction to propel mobile drive unit 20 in a backward direction. In the illustrated embodiment, drive module 120 is also configured to rotate mobile drive unit 20 by rotating motorized wheels 124 in different directions from one another or by rotating motorized wheels 124 at different speeds from one another.

Position sensor 140 represents one or more sensors, detectors, or other components suitable for determining the location of mobile drive unit 20 in any appropriate manner. For example, in particular embodiments, the workspace 70 associated with inventory system 10 includes a number of fiducial marks that mark points on a two-dimensional grid that covers all or a portion of workspace 70. In such embodiments, position sensor 140 may include a camera and suitable image- and/or video-processing components, such as an appropriately-programmed digital signal processor, to allow position sensor 140 to detect fiducial marks within the camera's field of view. Control module 170 may store location information that position sensor 140 updates as position sensor 140 detects fiducial marks. As a result, position sensor 140 may utilize fiducial marks to maintain an accurate indication of the location mobile drive unit 20 and to aid in navigation when moving within workspace 70.

Holder sensor 150 represents one or more sensors, detectors, or other components suitable for detecting inventory holder 30 and/or determining, in any appropriate manner, the location of inventory holder 30, as an absolute location or as a position relative to mobile drive unit 20. Holder sensor 150 may be capable of detecting the location of a particular portion of inventory holder 30 or inventory holder 30 as a whole. Mobile drive unit 20 may then use the detected information for docking with or otherwise interacting with inventory holder 30.

Obstacle sensor 160 represents one or more sensors capable of detecting objects located in one or more different directions in which mobile drive unit 20 is capable of moving. Obstacle sensor 160 may utilize any appropriate components and techniques, including optical, radar, sonar, pressure-sensing and/or other types of detection devices appropriate to detect objects located in the direction of travel of mobile drive unit 20. In particular embodiments, obstacle sensor 160 may transmit information describing objects it detects to control module 170 to be used by control module 170 to identify obstacles and to take appropriate remedial actions to prevent mobile drive unit 20 from colliding with obstacles and/or other objects.

Obstacle sensor 160 may also detect signals transmitted by other mobile drive units 20 operating in the vicinity of the illustrated mobile drive unit 20. For example, in particular embodiments of inventory system 10, one or more mobile drive units 20 may include an identification signal transmitter 162 that transmits a drive identification signal. The drive identification signal indicates to other mobile drive units 20 that the object transmitting the drive identification signal is in fact a mobile drive unit. Identification signal transmitter 162 may be capable of transmitting infrared, ultraviolet, audio, visible light, radio, and/or other suitable signals that indicate to recipients that the transmitting device is a mobile drive unit 20.

Additionally, in particular embodiments, obstacle sensor 160 may also be capable of detecting state information transmitted by other mobile drive units 20. For example, in particular embodiments, identification signal transmitter 162 may be capable of including state information relating to mobile drive unit 20 in the transmitted identification signal. This state information may include, but is not limited to, the position, velocity, direction, and the braking capabilities of the transmitting mobile drive unit 20. In particular embodiments, mobile drive unit 20 may use the state information transmitted by other mobile drive units to avoid collisions when operating in close proximity with those other mobile drive units.

Control module 170 monitors and/or controls operation of drive module 120 and docking actuator 130. Control module 170 may also receive information from sensors such as position sensor 140 and holder sensor 150 and adjust the operation of drive module 120, docking actuator 130, and/or other components of mobile drive unit 20 based on this information. Additionally, in particular embodiments, mobile drive unit 20 may be configured to communicate with a management device of inventory system 10 and control module 170 may receive commands transmitted to mobile drive unit 20 and communicate information back to the management device utilizing appropriate communication components of mobile drive unit 20. Control module 170 may include any appropriate hardware and/or software suitable to provide the described functionality. In particular embodiments, control module 170 includes a general-purpose microprocessor programmed to provide the described functionality. Additionally, control module 170 may include all or portions of docking actuator 130, drive module 120, position sensor 140, and/or holder sensor 150, and/or share components with any of these elements of mobile drive unit 20.

Moreover, in particular embodiments, control module 170 may include hardware and software located in components that are physically distinct from the device that houses drive module 120, docking actuator 130, and/or the other components of mobile drive unit 20 described above. For example, in particular embodiments, each mobile drive unit 20 operating in inventory system 10 may be associated with a software process (referred to here as a "drive agent")

operating on a server that is in communication with the device that houses drive module 120, docking actuator 130, and other appropriate components of mobile drive unit 20. This drive agent may be responsible for requesting and receiving tasks, requesting and receiving routes, transmitting state information associated with mobile drive unit 20, and/or otherwise interacting with management module 15 and other components of inventory system 10 on behalf of the device that physically houses drive module 120, docking actuator 130, and the other appropriate components of mobile drive unit 20. As a result, for the purposes of this description and the claims that follow, the term "mobile drive unit" includes software and/or hardware, such as agent processes, that provides the described functionality on behalf of mobile drive unit 20 but that may be located in physically distinct devices from the drive module 120, docking actuator 130, and/or the other components of mobile drive unit 20 described above.

While FIGS. 4 and 5 illustrate a particular embodiment of mobile drive unit 20 containing certain components and configured to operate in a particular manner, mobile drive unit 20 may represent any appropriate component and/or collection of components configured to transport and/or facilitate the transport of inventory holders 30. As another example, mobile drive unit 20 may represent part of an overhead crane system in which one or more crane assemblies are capable of moving within a network of wires or rails to a position suitable to dock with a particular inventory holder 30. After docking with inventory holder 30, the crane assembly may then lift inventory holder 30 and move inventory to another location for purposes of completing an assigned task.

Furthermore, in particular embodiments, mobile drive unit 20 may represent all or a portion of inventory holder 30. Inventory holder 30 may include motorized wheels or any other components suitable to allow inventory holder 30 to propel itself. As one specific example, a portion of inventory holder 30 may be responsive to magnetic fields. Inventory system 10 may be able to generate one or more controlled magnetic fields capable of propelling, maneuvering and/or otherwise controlling the position of inventory holder 30 as a result of the responsive portion of inventory holder 30. In such embodiments, mobile drive unit 20 may represent the responsive portion of inventory holder 30 and/or the components of inventory system 10 responsible for generating and controlling these magnetic fields. While this description provides several specific examples, mobile drive unit 20 may, in general, represent any appropriate component and/or collection of components configured to transport and/or facilitate the transport of inventory holders 30.

Figure 6:
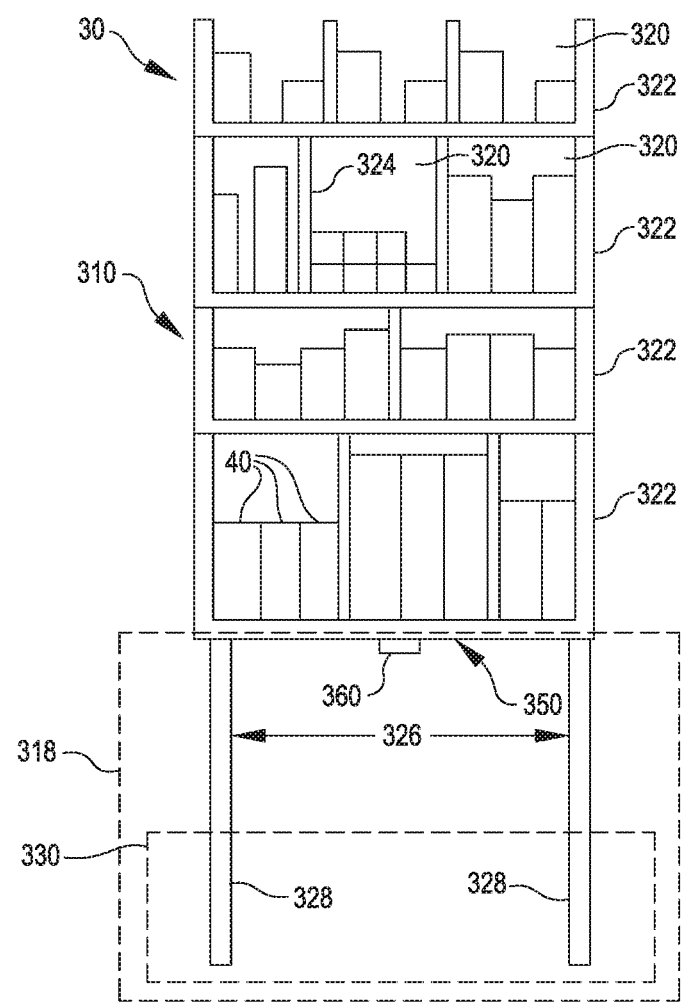
FIG. 6 illustrates in greater detail an example of an inventory holder that may be utilized in particular embodiments of the inventory system shown in FIG. 2.

FIG. 6 illustrates in greater detail the components of a particular embodiment of inventory holder 30. In particular, FIG. 6 illustrates the structure and contents of one side of an example inventory holder 30. In a particular embodiment, inventory holder 30 may comprise any number of faces with similar or different structure. As illustrated, inventory holder 30 includes a frame 310, a plurality of legs 328, and a docking surface 350.

Frame 310 holds inventory items 40. Frame 310 provides storage space for storing inventory items 40 external or internal to frame 310. The storage space provided by frame 310 may be divided into a plurality of inventory bins 320, each capable of holding inventory items 40. Inventory bins 320 may include any appropriate storage elements, such as bins, compartments, or hooks, and may correspond to examples of (or alternatives to) the bins 25 referenced with respect to FIG. 1.

In a particular embodiment, frame 310 is composed of a plurality of trays 322 stacked upon one another and attached to or stacked on a base 318. In such an embodiment, inventory bins 320 may be formed by a plurality of adjustable dividers 324 that may be moved to resize one or more inventory bins 320. In alternative embodiments, frame 310 may represent a single inventory bin 320 that includes a single tray 322 and no adjustable dividers 324. Additionally, in particular embodiments, frame 310 may represent a load-bearing surface mounted on mobility element 330. Inventory items 40 may be stored on such an inventory holder 30 by being placed on frame 310. In general, frame 310 may include internal and/or external storage space divided into any appropriate number of inventory bins 320 in any appropriate manner.

Additionally, in a particular embodiment, frame 310 may include a plurality of device openings 326 that allow mobile drive unit 20 to position docking head 110 adjacent docking surface 350. The size, shape, and placement of device openings 326 may be determined based on the size, the shape, and other characteristics of the particular embodiment of mobile drive unit 20 and/or inventory holder 30 utilized by inventory system 10. For example, in the illustrated embodiment, frame 310 includes four legs 328 that form device openings 326 and allow mobile drive unit 20 to position mobile drive unit 20 under frame 310 and adjacent to docking surface 350. The length of legs 328 may be determined based on a height of mobile drive unit 20.

Docking surface 350 comprises a portion of inventory holder 30 that couples to, abuts, and/or rests upon a portion of docking head 110, when mobile drive unit 20 is docked to inventory holder 30. Additionally, docking surface 350 supports a portion or all of the weight of inventory holder 30 while inventory holder 30 is docked with mobile drive unit 20. The composition, shape, and/or texture of docking surface 350 may be designed to facilitate maneuvering of inventory holder 30 by mobile drive unit 20. For example, as noted above, in particular embodiments, docking surface 350 may comprise a high-friction portion. When mobile drive unit 20 and inventory holder 30 are docked, frictional forces induced between docking head 110 and this high-friction portion may allow mobile drive unit 20 to maneuver inventory holder 30. Additionally, in particular embodiments, docking surface 350 may include appropriate components suitable to receive a portion of docking head 110, couple inventory holder 30 to mobile drive unit 20, and/or facilitate control of inventory holder 30 by mobile drive unit 20.

Holder identifier 360 marks a predetermined portion of inventory holder 30 and mobile drive unit 20 may use holder identifier 360 to align with inventory holder 30 during docking and/or to determine the location of inventory holder 30. More specifically, in particular embodiments, mobile drive unit 20 may be equipped with components, such as holder sensor 150, that can detect holder identifier 360 and determine its location relative to mobile drive unit 20. As a result, mobile drive unit 20 may be able to determine the location of inventory holder 30 as a whole. For example, in particular embodiments, holder identifier 360 may represent a reflective marker that is positioned at a predetermined location on inventory holder 30 and that holder sensor 150 can optically detect using an appropriately-configured camera.

Depending on the configuration and characteristics of mobile drive unit 20 and inventory system 10, mobile drive unit 20 may move inventory holder 30 using a variety of appropriate methods. In a particular embodiment, mobile drive unit 20 is capable of moving inventory holder 30 along a two-dimensional grid, combining movement along straight-line segments with ninety-degree rotations and arcing paths to transport inventory holder 30 from the first location to the second location. Additionally, while moving, mobile drive unit 20 may use fixed objects located in the workspace as reference points to assist in navigation. For example, in particular embodiments, inventory system 10 includes multiple fiducial marks. Mobile drive unit 20 may be configured to detect fiducial marks and to determine the location of mobile drive unit 20 and/or measure its movement based on the detection of fiducial marks.

After mobile drive unit 20 arrives at the second location, mobile drive unit 20 may perform appropriate operations to facilitate access to inventory items 40 stored in inventory holder 30. For example, mobile drive unit 20 may rotate inventory holder 30 to present a particular face of inventory holder 30 to an operator of inventory system 10 or other suitable party, such as a packer selecting inventory items 40 from inventory holder 30. Mobile drive unit 20 may also undock from inventory holder 30. Alternatively, instead of undocking at the second location, mobile drive unit 20 may transport inventory holder 30 back to the first location or to a third location after any appropriate actions have been taken involving inventory items 40. For example, after a packer has removed particular inventory items 40 from inventory holder 30, mobile drive unit 20 may return inventory holder 30 to its original storage location, a new storage location, or another inventory station. Mobile drive unit 20 may then undock from inventory holder 30 at this new location.

As described above, embodiments herein are directed to visual identification of storage locations in the inventory system 10, such as by glowing functionality. In addition to the features described with respect to FIG. 1, various additional or alternative features can be included among different elements of inventory system 10 to facilitate such functionality.

Figure 7:
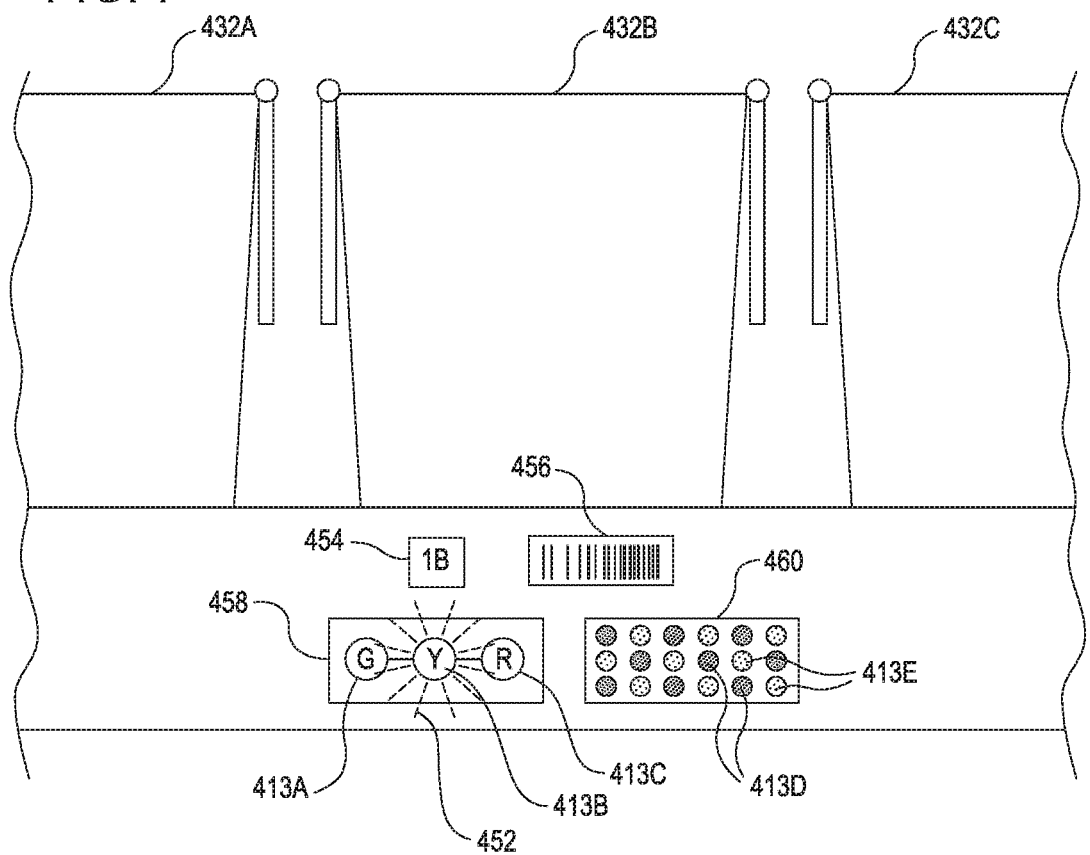
FIG. 7 illustrates in greater detail examples of labels that may be used to facilitate glowing in particular embodiments of the inventory system shown in FIG. 2.

FIG. 7 illustrates examples of labels that may be used to facilitate glowing functionality. The labels are illustrated in FIG. 7 in relation to containers 432, which may provide storage locations that are alternatives or supplements to the bins 25 described with respect to FIG. 1. For example, the containers 432 in some instances may be respectively received in bins 25. In some cases, the containers 432 are examples of the bins 25 from FIG. 1. The labels are illustrated in FIG. 7 on shelves supporting the containers 432, although the labels may additionally or alternatively be located elsewhere, including directly on the containers 432.

The labels illustrated in FIG. 7 include a location code label 454, a barcode label 456, an action code label 458, and an identifier label 460. Any of these or other labels may include markers 413 that can project visible light in response to received wavelengths. The location code label 454 may include an alphanumeric code or other indicia that designates a position within a larger overall grid, such as a code 1B designating a first row and a second column or a second position in the row. The barcode label 456 may include a barcode and/or other feature (such as a RFID tag or pressure activated button) that allows an operator 38 to log an identity of a location interacted with during an operation by the operator 38. In various aspects, a location code label 454 and/or a barcode label 456 may correspond to labels on an existing inventory holder that may be retrofitted with markers 413 to facilitate glowing functionality that can speed up or otherwise assist in identification or indication of storage locations (such as the containers 432) by an operator 38.

In some aspects, the location code label 454 and/or the barcode label 456 may be replaced and/or supplemented by either or both of the action code label 458 or the identifier label 460. The identifier label 460 may include markers 413 that facilitate the visual identification of a particular storage location, such as the container 432B. In some aspects, the identifier label 460 or other label may include multiple markers 413. For example, the identifier label 460 is shown with an alternating array of fourth markers 413D and fifth markers 413E. Such an arrangement may allow the identifier label 460 to glow in response to multiple wavelengths, such as both a wavelength that can trigger a response from the fourth markers 413D and a wavelength that can trigger a response from the fifth markers 413E. In some aspects, the array may be composed of sufficiently small units such that the identifier label 460 may appear to glow the same way regardless of which triggering wavelength is received.

The action code label 458 may include different markers 413A, 413B, and 413C to indicate different actions associated with the action code label 458. In some cases, the different markers 413A, 413B, and 413C correspond to different colors of light 452 that will project when the respective marker 413 is triggered. For example, the markers 413 of the action code label 458 in FIG. 7 are respectively shown as providing green, yellow, or red glows. Thus, in one illustrative example, a green glow may be provided from the first marker 413A to indicate that the container 432B is a preferred location for storing a particular inventory item 40, a yellow glow may be instead provided from the second marker 413B (as at 452) to indicate that the container 432B is a permissible location for storing the particular inventory item 40, and a red glow may be instead provided from the third marker 413C to indicate that the container 432B is a prohibited location for storing the particular inventory item 40. Thus, as maybe appreciated, different markers 413 may be used to provide either negative or positive cues to an operator 38. Other meanings besides those already described for the markers 413 may also be utilized, including, but not limited to, indicating a location where a particular inventory item is preferred to not be stored or retrieved from, a storage location in which a particular inventory item is stored or is to be stored, a storage location from which an item is to be retrieved or was retrieved, or a storage location in which inventory items are to be counted.

Figure 8:
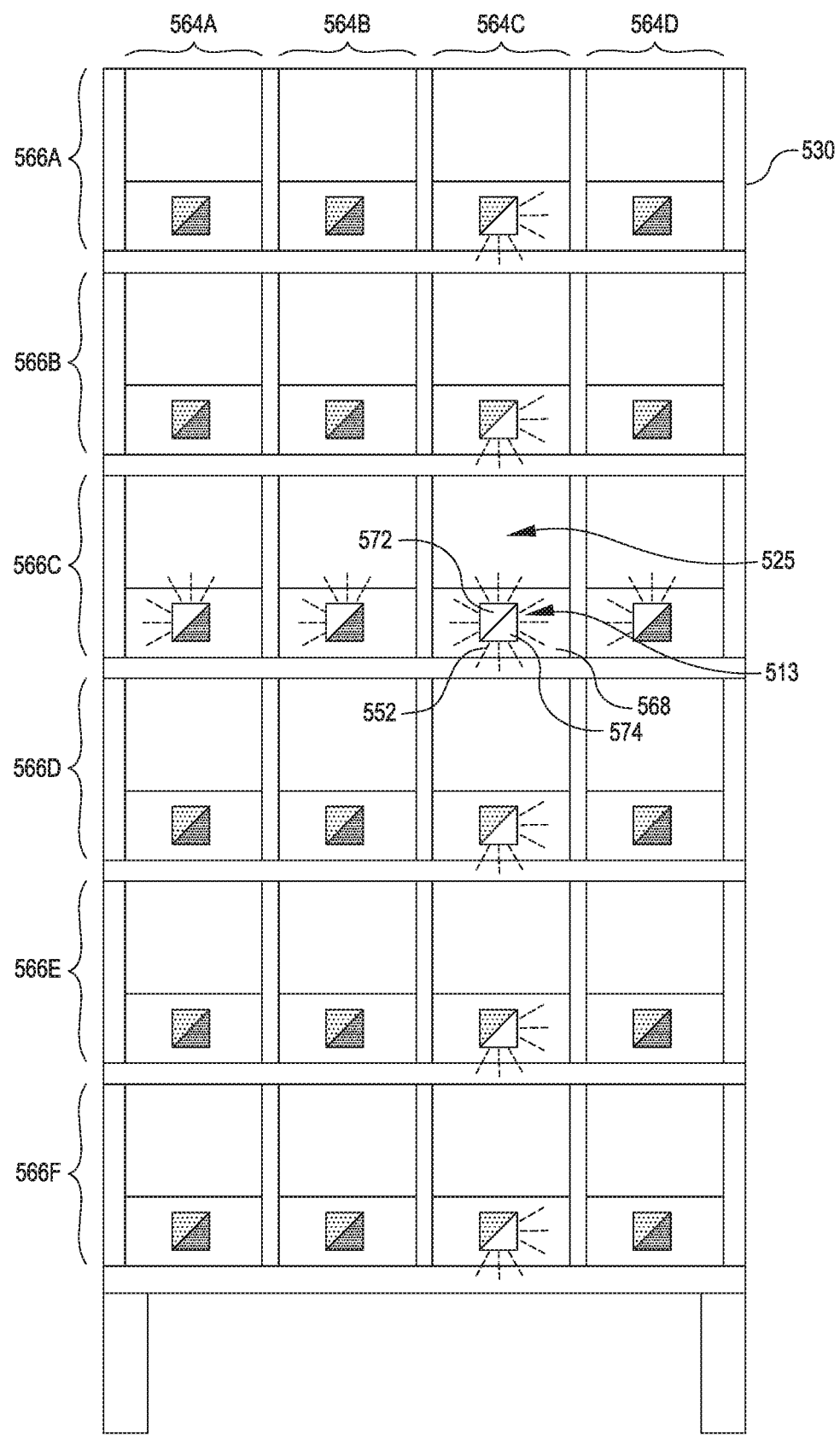
FIG. 8 illustrates in greater detail an example of a pattern that may be formed through glowing for visually indicating a bin in particular embodiments of the inventory system shown in FIG. 2.

FIG. 8 illustrates an example of a pattern that may be formed through glowing for visually indicating a particular bin 525 of an inventory holder 530. Markers 513 in FIG. 8 are disposed on retention bands 568 arranged across front open faces of bins 525, e.g. to prevent inadvertent movement of inventory items 40 out of the respective bins 525. Although the retention bands 568 are shown individually secured to each bin 525, in some aspects, a single retention band 568 may extend across multiple bins 525 and include a suitable plurality of markers 513 thereon for use in indicating associated bins 525.

The markers 513 in FIG. 8 are organized into columns 564A-D and rows 566A-F. The markers 513 differ in triggering wavelength according to the columns 564 and rows 566. The markers 513 are shown in FIG. 8 with a top portion 572 and a bottom portion 574. The top portion 572 of each of the markers 513 has a triggering wavelength shared with each of the other markers 513 in the same row 566. In contrast, the bottom portion 574 of each the markers has a triggering wavelength shared with each of the other markers in the same column 564. Thus, the illustrated crosshair pattern visually indicating or identifying the bin 525 of interest may be achieved by projecting both the triggering wavelength for the column 564C containing the bin 525 and the triggering wavelength for the row 566C containing the bin 525. In such an arrangement, a smaller number of total wavelengths (e.g., the sum of the columns and the rows) may be effectively utilized to allow identification of any one of the storage locations of the inventory holder 530 in comparison to an arrangement in which each storage location is associated with a unique wavelength (e.g., for a total number of wavelengths equal to the product of the columns and the rows).

In some aspects, the row 566C of interest and the column 564C of interest may glow concurrently. Additionally or alternatively, the row 566C and the column 564C may glow at different times from each other, e.g., sequentially or alternately. As an illustrative example, a wavelength source 42 may project suitable wavelengths to make the row 566C glow as the inventory holder 530 is moved toward a ready position at the station 50 (e.g., to provide an initial visual hint for the operator 38), and then the wavelength source 42 may overlay additional wavelengths to make the column 564C glow when the inventory holder 530 comes to a complete stop, e.g., so that the operator 38 sees the full crosshair pattern when the inventory holder 530 is optimally positioned for an operation by the operator 38.

Figure 9:
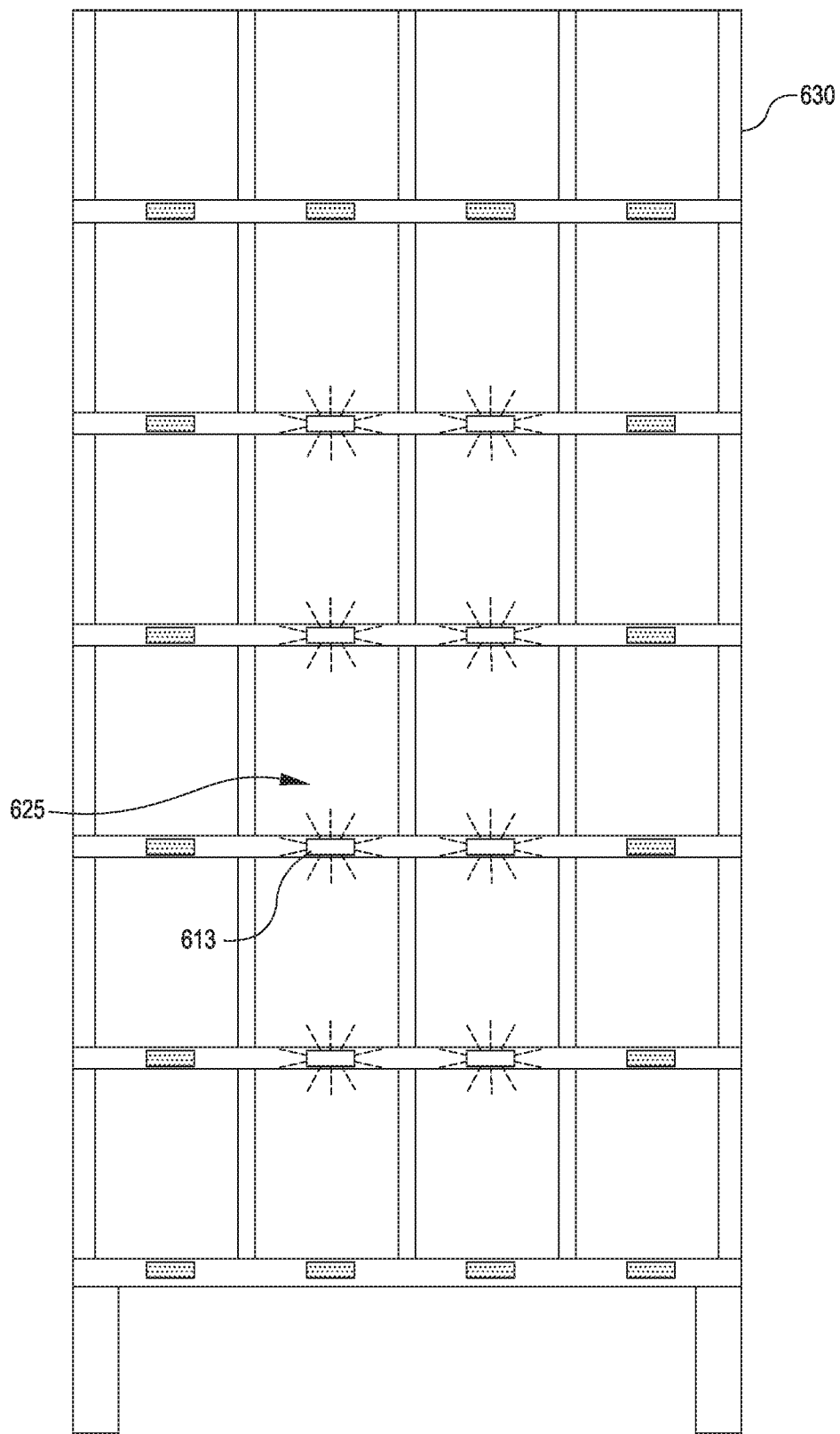
FIGS. 9-11 illustrates in greater detail an example of a sequence of glowing that may be used for indicating a bin in particular embodiments of the inventory system shown in FIG. 2.
Figure 10:
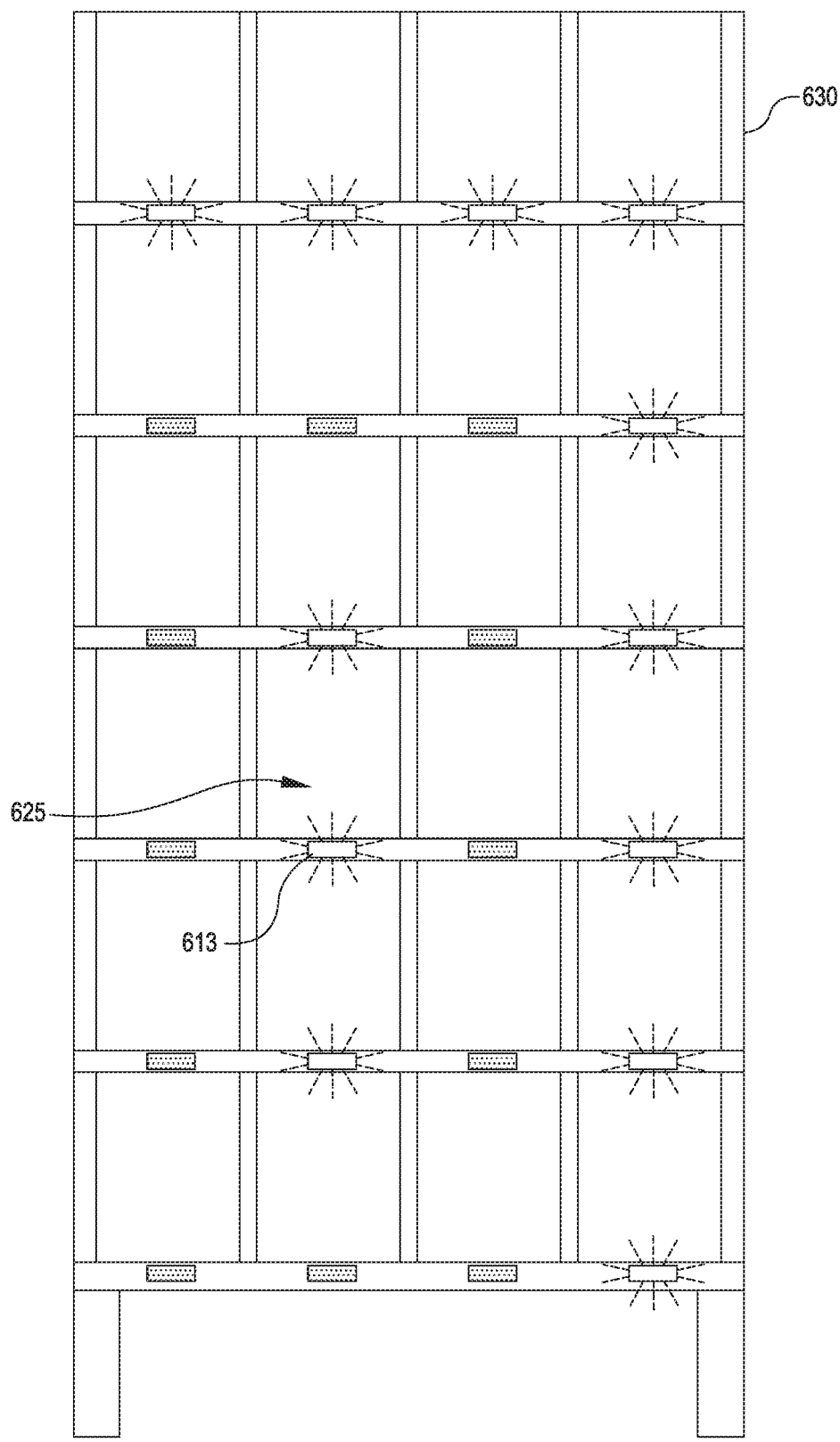
Figure 11:
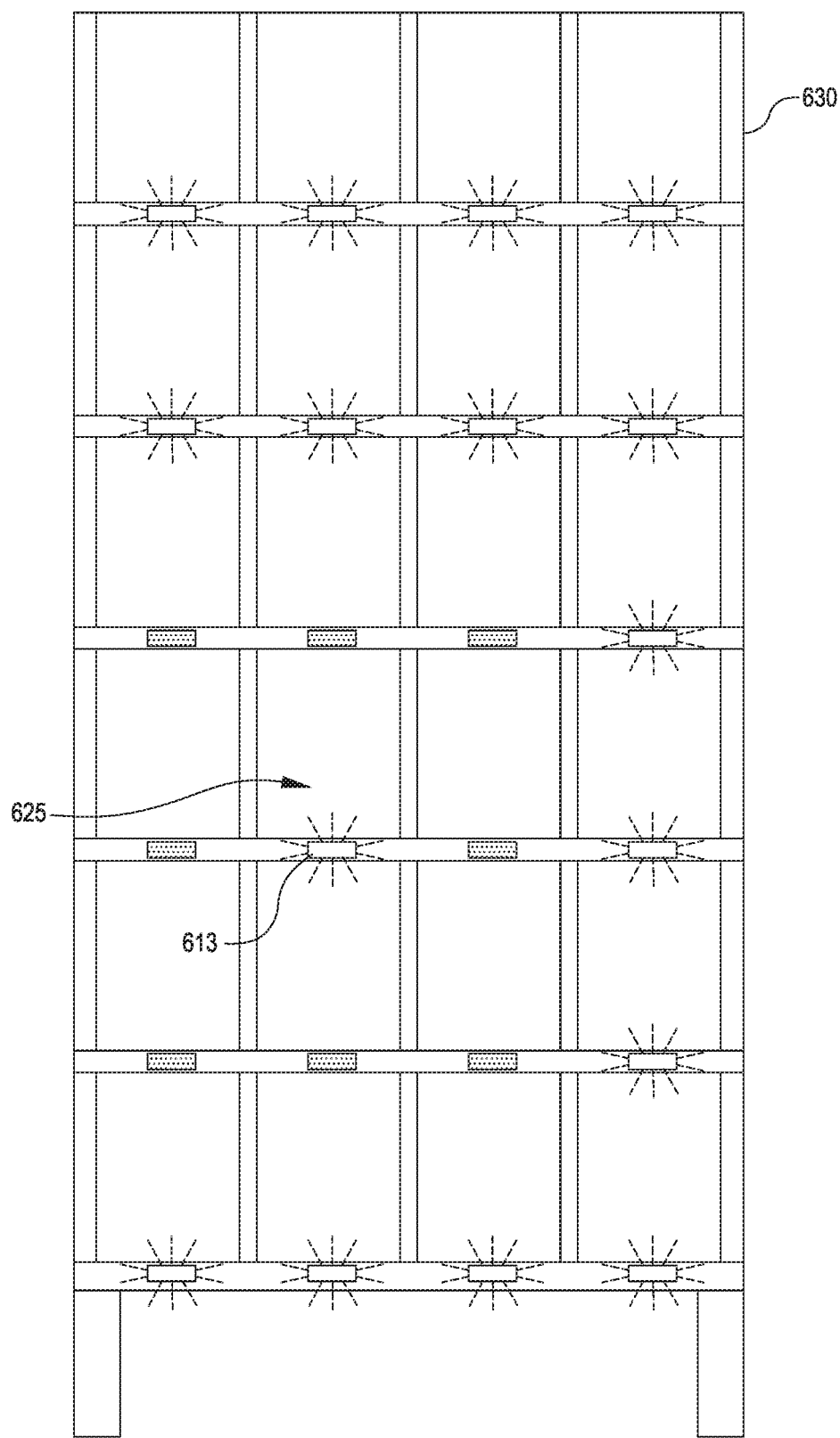

FIGS. 9-11 illustrate an example of a sequence of glowing that may be used for indicating a targeted bin 625. Markers 613 in FIG. 9 are selectively activated to provide an outer rectangle (e.g., four bins wide and six bins tall) around the targeted bin 625. The rectangle may be shrunk by changing the markers 613 that are activated. For example, in FIG. 10, the markers 613 have been activated in a different pattern to form a smaller rectangle (e.g., three bins wide and five bins tall) around the targeted bin 625. Referring to FIG. 11, the rectangle has been shrunk further to form a square (three bins wide and three bins tall) encircling the targeted bin 65. Thus, progressing through the states shown in FIGS. 9-11, the rectangle is reduced in size to encircle the bin 625 of interest, e.g., to provide a visible presentation for drawing the attention of an operator 38 to the targeted bin 625. Moreover, the markers 613 in FIGS. 9-11 are darkened in order to provide the visual presentation that draws the attention of the operator 38 to the bin 625 of interest. Hence, it may be appreciated that presentations for indicating a storage location herein may include activating or deactivating glowing of markers and/or may use glowing or non-glowing markers for implementing a suitable presentation to direct attention to an indicated storage location.

Markers have been described herein in many suitable locations. For example, markers 13 in FIG. 1 are shown on the surfaces formed on an interior of a bin 25. Markers 413 in FIG. 7 are shown formed in labels applied on a lip of a shelf. Markers 513 in FIG. 8 are shown on retention bands 568. Locations of markers are not limited to only these locations; these and any other suitable locations individually or in combination may be used for visually indicating associated storage locations. In some embodiments, markers remote from a given storage location may be used to indicate information about that storage location. For example, although the action code label 458 is shown and described in FIG. 7 adjacent to a particular container 432B on an inventory holder 30, the action code label 458 or other marker could alternatively be located on a structure at a station 50 apart from that inventory holder 30 (e.g., for providing confirmations, indications, acknowledgements, and/or commands etc. associated with that storage location 432B). As an illustrative example, FIG. 1 includes markers 813 on a structure at the station 50 (and remote from the inventory holder 30) that could provide such function. In some embodiments, markers may be utilized to provide indications for multiple storage locations. For example, although the action code label 458 from FIG. 7 is described above in an illustrative example as providing a confirmation or an alert with respect to the container 432B accessed adjacent to the action code label 458, the action code label 458 in some arrangements may be used equally for any other storage location on the inventory holder 30 (e.g., serving as a single structure for providing such an alert or confirmation about whichever storage location was last accessed on the inventory holder 30). In some aspects, the action code label 458 or other marker may be located on a base, pillar, or other structure of an inventory holder 30, such as for use with multiple of the storage locations on the inventory holder 30 or generally indicating information about the inventory holder 30 and/or associated storage locations.

Figure 12:
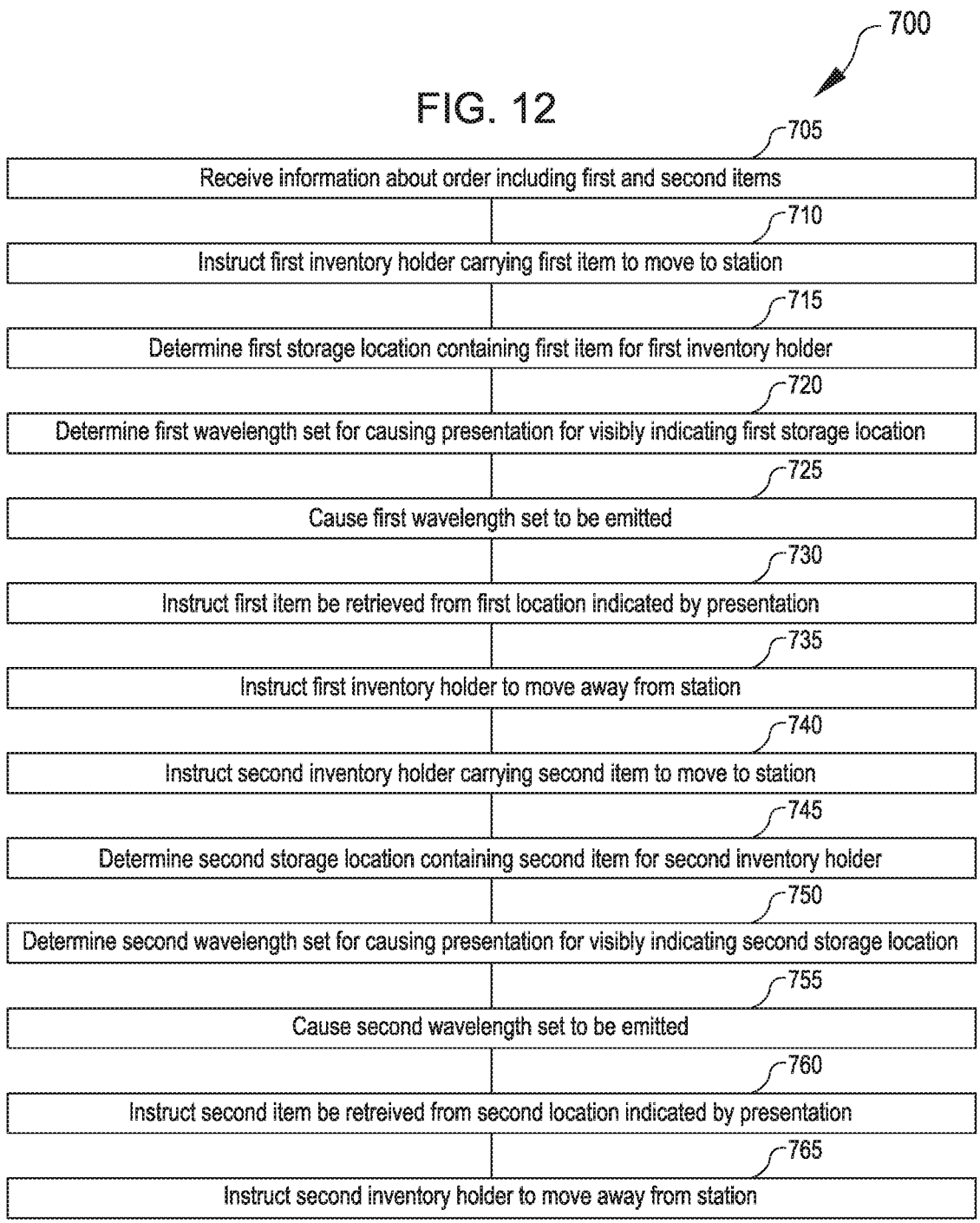
FIG. 12 is a flowchart illustrating an example process of utilizing glowing for indicating storage locations within the inventory system shown in FIG. 2.

FIG. 12 is a flowchart illustrating an example process 700 of utilizing glowing for indicating storage locations within an inventory system 10. The process 700 may be performed by the management module 15 and/or other components of the inventory system 10.

At block 705, the process 700 can include receiving information about an order including a first item and a second item. The first and second items may correspond to inventory items 40 that are stored within inventory holders 30 (e.g., a first inventory holder 30 and a second inventory holder 30) within the inventory system 10.

At block 710, the process 700 can include instructing a first inventory holder 30 carrying the first inventory item to move, or to be moved by a mobile drive unit, to a station 50.

At block 715, the process 700 can include determining a first storage location that contains the first inventory item 40 for the first inventory holder 30.

At block 720, the process 700 can include determining a first set of one or more wavelengths that will cause one or more markers of the first inventory holder 30 to project a presentation that visibly indicates the first storage location of the inventory holder 30 that contains the first inventory item 40. For example, this may correspond to a set of one or more wavelengths that will cause a row of markers and a column of markers of the first inventory holder 30 to emit light so as to be a glowing row of markers and a glowing column of markers that visibly indicate the first storage location by the intersection of the glowing row and glowing column.

At block 725, the process 700 can include causing the first set of one or more wavelengths to be emitted. This may correspond to the management module 15 communicating with the wavelength source 42. The first set of one or more wavelengths may be emitted so as to be received by each marker of a group of markers of the first inventory holder 30. This may cause less than all of the markers in the group to glow and provide a presentation for indicating the first storage location of the first inventory holder 30 that contains the first inventory item 40.

At block 730, the process 700 can include instructing the first item 40 to be retrieved from the first location of the first inventory holder indicated by the presentation that visibly indicates the first storage location of the first inventory holder 30. This may include instructions to place the first item in a receptacle for compiling items of the order such as the first item and the second item. This may correspond to the management module 15 providing instructions to the operator 38 to remove a designated item from a bin that is indicated by a glowing presentation.

At block 735, the process 700 can include instructing the first inventory holder 30 to move away, or to be moved away by a mobile drive unit, from the station 50.

At block 740, the process 700 can include instructing a second inventory holder 30 carrying the second inventory item to move, or to be moved by a mobile drive unit, to the station 50.

At block 745, the process 700 can include determining a second storage location of the second inventory holder 30 that contains the second inventory item.

At block 750, the process 700 can include determining a second set of one or more wavelengths that will cause one or more markers of the second inventory holder 30 to project a presentation that visibly indicates the second storage location of inventory holder 30 that contains the second inventory item 40.

At block 755, the process 700 can include causing the second set of one or more wavelengths to be emitted. The second set of one or more wavelengths may be emitted so as to be received by each marker of a group of markers of the second inventory holder 30, for example, so that fewer than all of the markers in the group glow and provide a presentation for indicating the second storage location of the second inventory holder 30 that contains the second inventory item 40.

At block 760, the process 700 can include instructing that the second item be retrieved from the second location of the second inventory holder indicated by the presentation that visibly indicates the second storage location of the second inventory holder 30. This may include instructions for an operator to place the second item in the receptacle for compiling items of the order.

At block 765, the process 700 can include instructing the second inventory holder 30 to move away, or to be moved away by a mobile drive unit, from the station. In various aspects, operations similar to blocks 705-735 and/or 740-765 may be iterated for facilitating additional picking operations for ordered items through the use of glowing functionality to indicate associated storage locations.

FIG. 13 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing information which can be used by modules described herein, such as resource scheduling information 1012, route planning information 1014, segment reservation information 1016, and/or inventory information 1018. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1000 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®' and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system, comprising:
    an inventory holder comprising a first storage location and a second storage location each configured to store one or more inventory items;
    an ultraviolet wavelength source, the ultraviolet wavelength source operable to selectively emit a first ultraviolet wavelength and a second ultraviolet wavelength, the second ultraviolet wavelength being different than the first ultraviolet wavelength;
    a first marker associated with the first storage location, the first marker comprising a first material configured to emit a first visible light in response to receiving the first ultraviolet wavelength;
    a second marker associated with the second storage location, the second marker comprising second material configured to emit a second visible light in response to receiving the second ultraviolet wavelength; and
    one or more processors of a computer system, having memory configured to store and execute instructions, configured to:
        determine a storage location for an inventory item to be stored, the storage location being determined from among the first storage location and the second storage location;
        responsive to determining the storage location, identify an ultraviolet wavelength associated with the storage location;
        when the storage location is the first storage location, provide first instructions that cause the ultraviolet wavelength source to emit the first ultraviolet wavelength based at least in part on the ultraviolet wavelength identified as being associated with the storage location, the first ultraviolet wavelength being emitted toward the first and second markers so as to cause the first marker to respond by emitting the first visible light that visibly indicates the first storage location; and
        when the storage location is the second storage location, provide second instructions that cause the ultraviolet wavelength source to emit the second ultraviolet wavelength based at least in part on the ultraviolet wavelength identified as being associated with the storage location, the second ultraviolet wavelength being emitted toward the first and second markers so as to cause the second marker to respond by emitting the second visible light that visibly indicates the second storage location,
    wherein both the first marker and the second marker are further configured to emit the first visible light and the second visible light, respectively, independent of a direct line of sight between the ultraviolet wavelength source and the first marker or the second marker.

2. The inventory system of claim 1, further comprising a mobile drive unit configured to move the inventory holder, wherein the one or more processors of the computer system are configured to provide the first instructions or second instructions that cause the ultraviolet wavelength source to emit one of the first ultraviolet wavelength or the second ultraviolet wavelength during movement of the inventory holder by the mobile drive unit.

3. The inventory system of claim 1, wherein the first material of the first marker is applied to at least one of:
    one or more walls or interior surfaces of the first storage location;
    a lip of the first storage location positioned along a face of the inventory holder;
    the first storage location or nearby the first storage location;
    a retention band of material disposed across an open face of the first storage location;
    a structure at a station for receiving the inventory holder; or
    a portion of the inventory holder remote from the first storage location.

4. The inventory system of claim 1, wherein the storage location corresponds to at least one of:
    the storage location for which an action is to be performed;
    the storage location for which the action has been performed;
    the storage location in which the particular inventory item is permitted to be stored;
    the storage location in which the particular inventory item is preferred to be stored;
    the storage location in which the particular inventory item is preferred to not be stored;
    the storage location in which the particular inventory item is prohibited from being stored;
    the storage location in which the particular inventory item is stored;

the storage location from which the particular inventory item is to be retrieved;

the storage location in which inventory items are to be counted; or the storage location in which inventory items are to be verified or inspected.

5. A management module, comprising:

one or more processors of a computer system; and memory having stored therein instructions that, when executed by the one or more processors of the computer system, cause the computer system to:

determine an item is to be stored within a workspace managed by the management module;

determine a storage location to be utilized to store the item within the workspace from among a set of storage locations of the workspace, each of the set of storage locations associated with at least one marker of a set of markers, each of the set of storage locations being associated with a respective wavelength, each of the set of markers comprising a coating or material configured to emit a corresponding visible light in response to receiving the respective wavelength;

identify a subset of storage locations from the set of storage locations based at least in part on locations of each of the subset of storage locations with respect to the storage location determined to store the item;

identify a set of one or more wavelengths corresponding to a subset of storage locations; and provide instructions configured to cause a wavelength source to emit the set of one or more wavelengths toward the subset of storage locations so as to cause one or more markers corresponding to the subset of storage locations to emit a visible light presentation to indicate the location of the storage location to be utilized to store the item within the workspace.

6. The management module of claim 5, wherein the set of one or more wavelengths emitted toward the subset of storage locations comprises wavelengths invisible to an unaided human eye.

7. The management module of claim 5, wherein the set of one or more wavelengths comprises ultraviolet wavelengths.

8. The management module of claim 5, wherein the visible light presentation comprises the one or more markers emitting visible light in a sequence to identify the storage location to be utilized to store the item within the workspace.

9. The management module of claim 5, wherein the visible light presentation comprises the one or more markers emitting visible light in a pattern, the pattern including a row of the subset of storage locations and a column of the subset of storage locations, the column intersecting the row to identify the storage location to be utilized to store the item within the workspace.

10. The management module of claim 5, wherein the visible light presentation comprises the one or more markers emitting visible light in a shape that sequentially shrinks around the storage location to be utilized to store the item within the workspace.

11. The management module of claim 5, wherein the visible light presentation comprises the one or more markers emitting visible light at positions other than the storage location to be utilized to store the item within the workspace.

12. A method comprising:

determining a storage location to be utilized to store an item, the storage location being determined from a set of storage locations within a workspace, each of the set of storage locations being associated with a non-visible light wavelength and at least one marker of a set of markers, each marker of the set of markers being positioned to identify a corresponding storage location of the set of storage locations and each marker comprising a material configured to emit a visible light wavelength in response to receiving the non-visible light wavelength associated with the corresponding storage location;

identifying a subset of storage locations of the set of storage locations within the workspace based at least in part on a location of the storage location and respective locations of the set of storage locations;

identifying a set of non-visible light wavelengths associated with the subset of storage locations;

instructing a wavelength source to emit a set of one or more non-aimed, non-visible light wavelengths according to the set of non-visible light wavelengths identified as being associated with the subset of storage locations, the set of one or more non-aimed, non-visible light wavelengths being emitted toward the subset of storage locations, wherein receipt of the set of non-visible light wavelengths by the one or more markers corresponding to the subset of storage locations causes the one or more markers to emit a visible presentation that identifies the storage location or provides a visible indication of an action associated with the storage location.

13. The method of claim 12, wherein at least one marker of the set of markers is located on an inventory holder that includes at least one of the set of storage locations.

14. The method of claim 12, wherein the set of markers comprises a first marker located on a first inventory holder that includes at least one of the set of storage locations;

wherein the set of markers comprises a second marker located on a second inventory holder that includes at least one of the set of storage locations; and wherein the first marker and the second marker are each configured to emit visible light in response to receiving the set of non-visible light wavelengths.

15. The method of claim 12, wherein at least one marker of the set of markers is located at a station configured for receiving, by movement of a mobile drive unit, an inventory holder including at least one of the set of storage locations.

16. The method of claim 14, wherein the first marker is configured to emit first visible light in a first visible light wavelength, and the second marker is configured to emit second visible light in a second visible light wavelength, the first visible light wavelength being different from the second visible light wavelength.

17. The method of claim 12, wherein the set of non-visible light wavelengths comprises one or more ultraviolet wavelengths.

18. The method of claim 12, wherein the visible presentation comprises the one or more markers emitting visible light in at least one of a pattern or a sequence to identify the storage location to be utilized to store the item.

19. The method of claim 12, wherein instructing the wavelength source to emit the set of one or more non-aimed, non-visible light wavelengths causes the wavelength source to emit two or more non-aimed, non-visible light wavelengths concurrently, alternately, or sequentially.

* * * * *

UNITED STATES PATENT AND TRADEMARK OFFICE
CERTIFICATE OF CORRECTION

PATENT NO.         : 10,692,041 B1
APPLICATION NO.    : 15/087704
DATED              : June 23, 2020
INVENTOR(S)        : Sergio Mendola Page 1 of 1

It is certified that error appears in the above-identified patent and that said Letters Patent is hereby corrected as shown below:

In the Claims

Column 27, Line 45, Claim 8:
Delete: "emitting visible light in a sequence"
Insert -- "emitting the visible light presentation in a sequence" --

Column 27, Line 49, Claim 9:
Delete: "emitting visible light in a pattern"
Insert -- "emitting the visible light presentation in a pattern" --

Column 27, Line 61, Claim 11:
Delete: "emitting visible light at positions"
Insert -- "emitting the visible light presentation at positions" --

Signed and Sealed this
Nineteenth Day of January, 2021

Andrei Iancu
*Director of the United States Patent and Trademark Office*